US009383921B2

(12) United States Patent
Van Eerd et al.

(10) Patent No.: US 9,383,921 B2
(45) Date of Patent: Jul. 5, 2016

(54) TOUCH-SENSITIVE DISPLAY METHOD AND APPARATUS

(71) Applicant: BlackBerry Limited, Waterloo (CA)

(72) Inventors: Peter Anthony Van Eerd, Guelph (CA); Sean David Drew Wilson, Waterloo (CA); James Ehrismann, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/849,050

(22) Filed: Sep. 9, 2015

(65) Prior Publication Data
US 2015/0378601 A1 Dec. 31, 2015

Related U.S. Application Data

(63) Continuation of application No. 13/339,155, filed on Dec. 28, 2011, now Pat. No. 9,141,280.

(60) Provisional application No. 61/557,873, filed on Nov. 9, 2011.

(51) Int. Cl.
G06F 3/0488 (2013.01)
G06F 3/01 (2006.01)
(Continued)

(52) U.S. Cl.
CPC ............ *G06F 3/04886* (2013.01); *G06F 3/016* (2013.01); *G06F 3/04817* (2013.01); *G06F 3/04842* (2013.01); *G06F 3/04883* (2013.01);
(Continued)

(58) Field of Classification Search
CPC ...... G06F 3/0488; G06F 3/044; G06F 3/0412
See application file for complete search history.

(56) References Cited

U.S. PATENT DOCUMENTS 5,231,698 A 7/1993 Forcier
5,347,295 A 9/1994 Agulnick et al.
(Continued)

FOREIGN PATENT DOCUMENTS

DE 19519417 11/1996
DE 102005056459 1/2007
(Continued)

OTHER PUBLICATIONS

"Android does not like my fingers?", Blog Post, Jan. 12, 2011; 2 pages.
(Continued)

*Primary Examiner* — Gerald Johnson
(74) *Attorney, Agent, or Firm* — Fish & Richardson P.C.

(57) ABSTRACT

An example method includes associating a first area of a non-display area of a touch-sensitive display with a first control, wherein a touch associated with the first control results in moving an indicator through the information in a first direction and in a second direction. The method may also include associating a second area of the non-display area with a second control, wherein a touch associated with the second control results in moving the indicator through the information in the first direction and in the second direction. The method may also include detecting a first touch associated with the first control, in response to detecting the first touch, moving the indicator in the first direction, detecting a second touch associated with the second control, and in response to detecting the second touch, moving the indicator in the first direction.

18 Claims, 12 Drawing Sheets

(51) Int. Cl.
*G06F 3/0481* (2013.01)
*G06F 3/0484* (2013.01)

(52) U.S. Cl.
CPC .............. *G06F 2203/0339* (2013.01); *G06F 2203/04805* (2013.01); *G06F 2203/04806* (2013.01); *G06F 2203/04808* (2013.01)

(56) References Cited

U.S. PATENT DOCUMENTS

| | | | |
|---|---|---|---|
| 5,523,775 | A | 6/1996 | Capps |
| 5,666,552 | A | 9/1997 | Greyson et al. |
| 5,739,946 | A | 4/1998 | Iwanaga et al. |
| 6,073,036 | A | 6/2000 | Heikkinen |
| 6,088,024 | A | 7/2000 | Yamagata |
| 6,169,538 | B1 | 1/2001 | Nowlan et al. |
| 6,211,856 | B1 | 4/2001 | Choi et al. |
| 6,240,430 | B1 | 5/2001 | Deike et al. |
| 6,287,485 | B1 | 9/2001 | Akashi et al. |
| 6,370,282 | B1 | 4/2002 | Pavley et al. |
| 6,894,677 | B2 | 5/2005 | Kazmaier et al. |
| 6,956,979 | B2 | 10/2005 | Janakiraman et al. |
| 6,970,159 | B2 | 11/2005 | Gray |
| 7,062,723 | B2 | 6/2006 | Smith et al. |
| 7,197,718 | B1 | 3/2007 | Westerman et al. |
| 7,212,332 | B2 | 5/2007 | Chee |
| 8,453,186 | B2 | 5/2013 | Roberts et al. |
| 8,525,800 | B2 | 9/2013 | Kao et al. |
| 8,531,417 | B2 | 9/2013 | Griffin et al. |
| 8,656,315 | B2 | 2/2014 | Kirkpatrick |
| 2002/0080123 | A1 | 6/2002 | Kennedy et al. |
| 2002/0191029 | A1 | 12/2002 | Gillespie et al. |
| 2003/0068088 | A1 | 4/2003 | Janakiraman et al. |
| 2003/0142081 | A1 | 7/2003 | Iizuka |
| 2004/0204821 | A1 | 10/2004 | Tu |
| 2005/0093826 | A1 | 5/2005 | Huh |
| 2005/0237310 | A1 | 10/2005 | Fabritius et al. |
| 2006/0026535 | A1 | 2/2006 | Hotelling et al. |
| 2006/0029451 | A1 | 2/2006 | Mcloone |
| 2006/0059437 | A1 | 3/2006 | Conklin |
| 2006/0077179 | A1 | 4/2006 | Hsu et al. |
| 2006/0161870 | A1 | 7/2006 | Hotelling et al. |
| 2006/0189278 | A1 | 8/2006 | Scott |
| 2006/0218492 | A1 | 9/2006 | Andrade |
| 2006/0238517 | A1 | 10/2006 | King et al. |
| 2006/0267803 | A1 | 11/2006 | Mathis |
| 2007/0075922 | A1 | 4/2007 | Jessop |
| 2007/0100800 | A1 | 5/2007 | Rose et al. |
| 2007/0146335 | A1 | 6/2007 | Hsieh et al. |
| 2007/0245269 | A1 | 10/2007 | Kim et al. |
| 2007/0250786 | A1 | 10/2007 | Jeon et al. |
| 2007/0260981 | A1 | 11/2007 | Kim et al. |
| 2008/0036743 | A1 | 2/2008 | Westerman et al. |
| 2008/0055269 | A1 | 3/2008 | Lemay et al. |
| 2008/0122796 | A1 | 5/2008 | Jobs et al. |
| 2008/0158185 | A1 | 7/2008 | Westerman |
| 2008/0165142 | A1 | 7/2008 | Kocienda et al. |
| 2008/0167081 | A1 | 7/2008 | Eng |
| 2008/0174570 | A1 | 7/2008 | Jobs et al. |
| 2008/0273018 | A1 | 11/2008 | Woolley et al. |
| 2009/0007026 | A1 | 1/2009 | Scott |
| 2009/0058690 | A1 | 3/2009 | Scott |
| 2009/0109182 | A1 | 4/2009 | Fyke et al. |
| 2009/0125848 | A1 | 5/2009 | Keohane et al. |
| 2009/0160805 | A1 | 6/2009 | Hosokawa et al. |
| 2009/0167700 | A1 | 7/2009 | Westerman et al. |
| 2009/0227369 | A1 | 9/2009 | Higbie et al. |
| 2009/0228792 | A1 | 9/2009 | Van Os et al. |
| 2009/0278806 | A1 | 11/2009 | Duarte et al. |
| 2009/0322687 | A1 | 12/2009 | Duncan et al. |
| 2010/0088654 | A1 | 4/2010 | Henhoeffer |
| 2010/0090963 | A1 | 4/2010 | Dubs et al. |
| 2010/0156813 | A1 | 6/2010 | Duarte et al. |
| 2010/0171711 | A1 | 7/2010 | Mak-Fan et al. |
| 2010/0171713 | A1* | 7/2010 | Kwok .................. G06F 3/0488 345/173 |
| 2010/0179958 | A1 | 7/2010 | Carr |
| 2010/0235793 | A1 | 9/2010 | Ording et al. |
| 2010/0315359 | A1 | 12/2010 | Seong et al. |
| 2011/0041096 | A1 | 2/2011 | Larco et al. |
| 2011/0099513 | A1 | 4/2011 | Ameline |
| 2011/0113318 | A1 | 5/2011 | Hirosawa et al. |
| 2011/0148774 | A1* | 6/2011 | Pihlaja ................ G06F 3/04883 345/173 |
| 2011/0169750 | A1 | 7/2011 | Pivonka et al. |
| 2011/0175826 | A1 | 7/2011 | Moore et al. |
| 2011/0216007 | A1 | 9/2011 | Cheng et al. |
| 2011/0302532 | A1 | 12/2011 | Missig |
| 2012/0011438 | A1 | 1/2012 | Kim et al. |
| 2012/0013541 | A1 | 1/2012 | Boka et al. |
| 2012/0169610 | A1 | 7/2012 | Berkes et al. |
| 2012/0206363 | A1 | 8/2012 | Kyprianou et al. |
| 2013/0002719 | A1 | 1/2013 | Ide |
| 2013/0113717 | A1 | 5/2013 | Van Eerd et al. |
| 2013/0113718 | A1 | 5/2013 | Van |
| 2013/0113719 | A1 | 5/2013 | Griffin et al. |

FOREIGN PATENT DOCUMENTS

| | | |
|---|---|---|
| EP | 1847915 | 10/2007 |
| EP | 1847917 | 10/2007 |
| EP | 1993024 | 11/2008 |
| EP | 1993030 | 11/2008 |
| EP | 2075682 | 7/2009 |
| EP | 2192479 | 6/2010 |
| EP | 2284671 | 2/2011 |
| EP | 2431849 | 3/2012 |
| EP | 2407892 | 10/2012 |
| WO | 2006020305 | 2/2006 |
| WO | 2007037809 | 4/2007 |
| WO | 2007082290 | 7/2007 |
| WO | 2009157687 | 12/2009 |
| WO | 2011088218 | 7/2011 |
| WO | 2011088281 | 7/2011 |

OTHER PUBLICATIONS

"Cursor Control & Fast Text Messages (Help?)", Blog Post, Jan. 13, 2011; 5 pages.
"Download: HTC IME Keyboard for Droid X", Blog Post, Jul. 22, 2010; 9 pages.
"Droid X General Discussions", Blog Post, Aug. 14, 2010; 6 pages.
"Mobile Magnifier Pocket", Able Data, NIDRR, http://www.abledata.com/abledata.cfm?pageid=19327&top=15430&ksect . . . , Jun. 17, 2011, 3 pages.
"Using Binding to position a Collection of elements", Blog Post, http:/fwww.thejoyofcode.com/Archive.aspx?month= 1O &year=2007, Oct. 2007; 23 Pages.
"WinMobile Magnifier", http:/fwww.adisasta.com/wmMagnifier.html, retrieved on Oct. 30, 2011, 1 page.
Any way to make touch screen act like a touchpad?, Blog Post, Jun. 1, 2008; 6 pages. D.
At&T, "Mobile Speak and Mobile Magnifier by Code Factory", http://www.wireless.att.com/learn/articles-resources/ disability-resource . . . , retrieved on Jun. 17, 2011; 3 pages.
Burton and Huffman, "Dialing Up the Magnification: A Review of Mobile Magnifier," 6(6), Nov. 2005; 11 pages.
Fakhre, "Remoter: Now remotely control your PC via Mobile, Using Touchpad Mouse and Virtual Keyboard", Blog Post, Mar. 3, 2011; 9 pages.
Harvard Edu, "Adaptive Technology Lab—FAQs", President & Fellows of Harvard College, http://lab.dce.harvard. edu, retrieved Oct. 30, 2011, 5 pages.
Kotike, kotike.org, New IPhone Features, weblog, last posting date Jul. 5, 2007, 16 pages.
McAllister, Graham; "A Guide to iOS Twin Stick Shooter Usability", Gamasutra, The Art & Business of Making Games, http:/fwww.gamasutra.com/view/feature/6323/a_guide_to_ios_twin_stick_shooter_.php?print=1, Mar. 30, 2011, (17 pages).

(56) References Cited

OTHER PUBLICATIONS

Russakovskii, "Tip: How to Get Arrow/Cursor Keys on the Swype Keyboard", Article, Jul. 5, 2010; 13 pages.
Virtual-Touchpad, http://code.google.com/p/virtual-touchpad/, Google 2011, Retrieved on Oct. 30, 2011, 1 page.
Extended European Search Report in European Application No. 07119388.2, dated Jan. 17, 2008, 5 pages.
Extended European Search Report in European Application No. 11875341.7. dated Jun. 18, 2015, 8 pages.
International Preliminary Report on Patentability in International Application No. PCT/CA2011/001413, dated May 22, 2014, 12 pages.
International Preliminary Report on Patentability in International Application No. PCT/CA2011/001414, dated May 22, 2014, 10 pages.
International Preliminary Report on Patentability in International Application No. PCT/CA2011/001415, dated May 22, 2014, 9 pages.
International Search Report and Written Opinion in International Application No. PCT/CA2011/001413, dated Aug. 7, 2012, 16 pages.
International Search Report and Written Opinion in International Application No. PCT/CA2011/001414, dated Jul. 12, 2012, 13 pages.
International Search Report and Written Opinion in International Application No. PCT/CA2011/001415, dated Jul. 23, 2012, 11 pages.

* cited by examiner

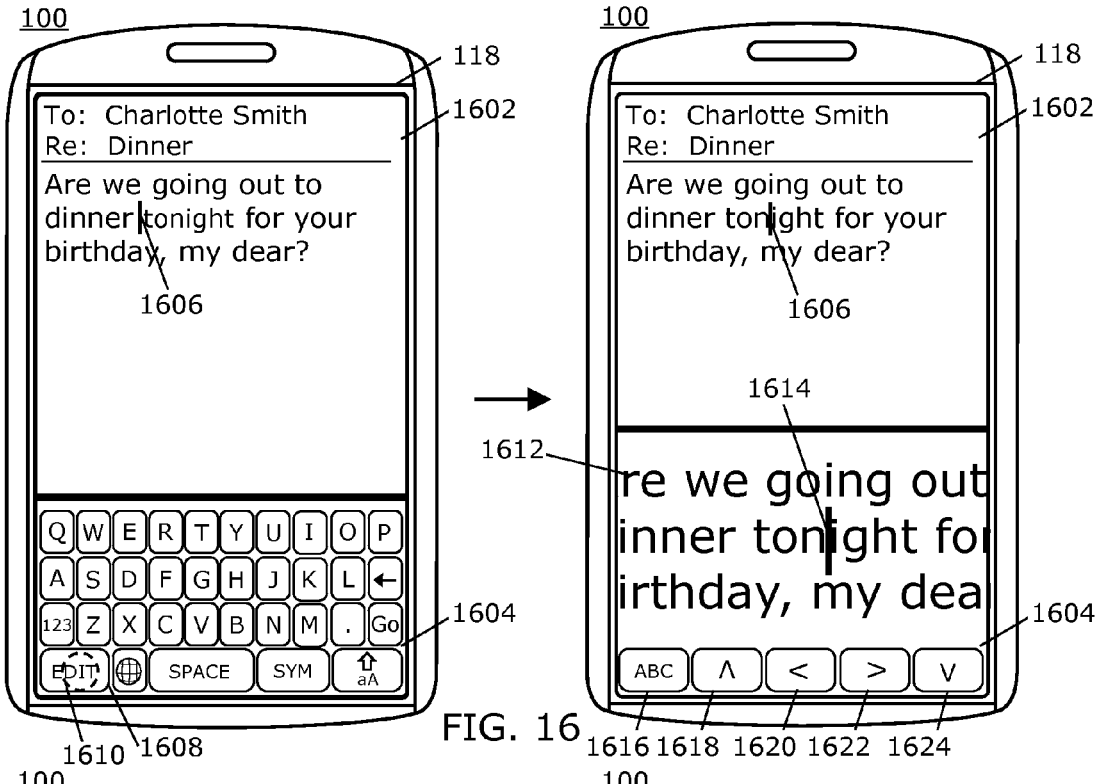
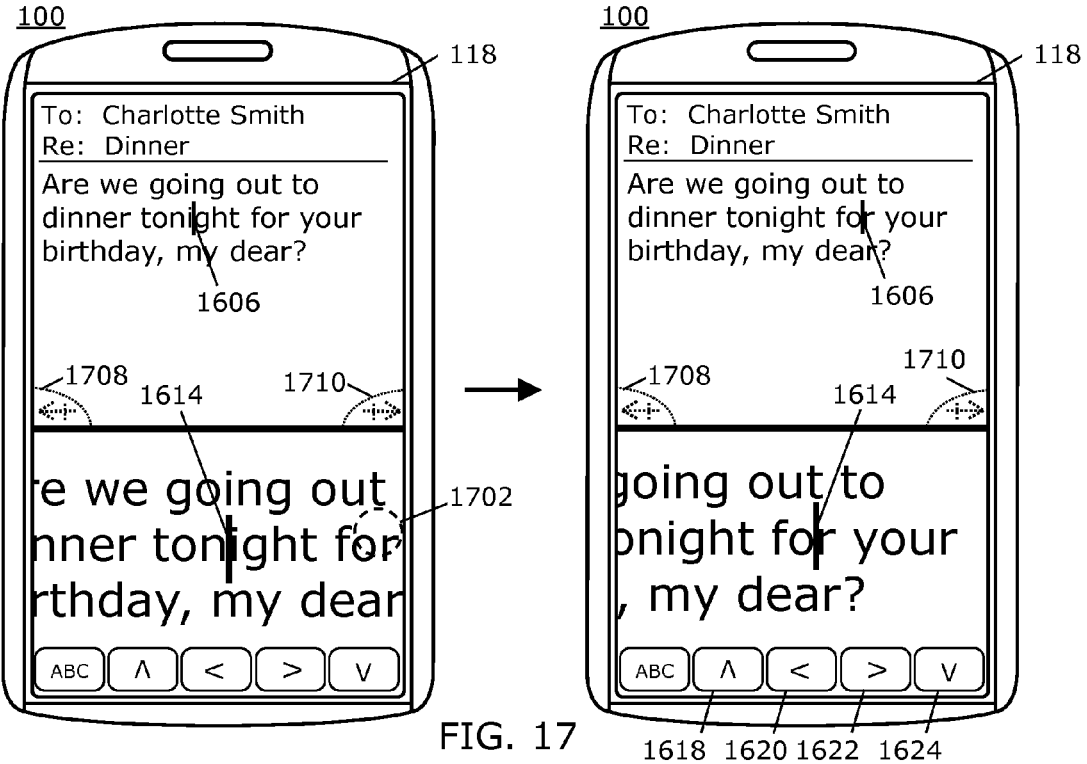

TOUCH-SENSITIVE DISPLAY METHOD AND APPARATUS

CROSS REFERENCE TO RELATED APPLICATIONS

This patent application is a continuation of and claims priority to U.S. application Ser. No. 13/339,155, filed on Dec. 28, 2011, which claims priority to U.S. Provisional Patent Application No. 61/557,873, filed on Nov. 9, 2011, titled "TOUCH-SENSITIVE DISPLAY METHOD AND APPARATUS," which are hereby incorporated herein by reference in their entirety. This patent application is related to U.S. application Ser. No. 13/339,138, titled "TOUCH-SENSITIVE DISPLAY METHOD AND APPARATUS," U.S. application Ser. No. 13/339,146, titled "TOUCH-SENSITIVE DISPLAY METHOD AND APPARATUS," and U.S. application Ser. No. 13/339,151, titled "TOUCH-SENSITIVE DISPLAY METHOD AND APPARATUS."

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

BRIEF DESCRIPTION OF THE DRAWINGS

FIG. 16 and FIG. 19 illustrate examples of invoking an enlargement on an electronic device in accordance with the disclosure.

FIG. 17 illustrates an example of moving an indicator through information on an electronic device in accordance with the disclosure.

DETAILED DESCRIPTION

Figure 1:
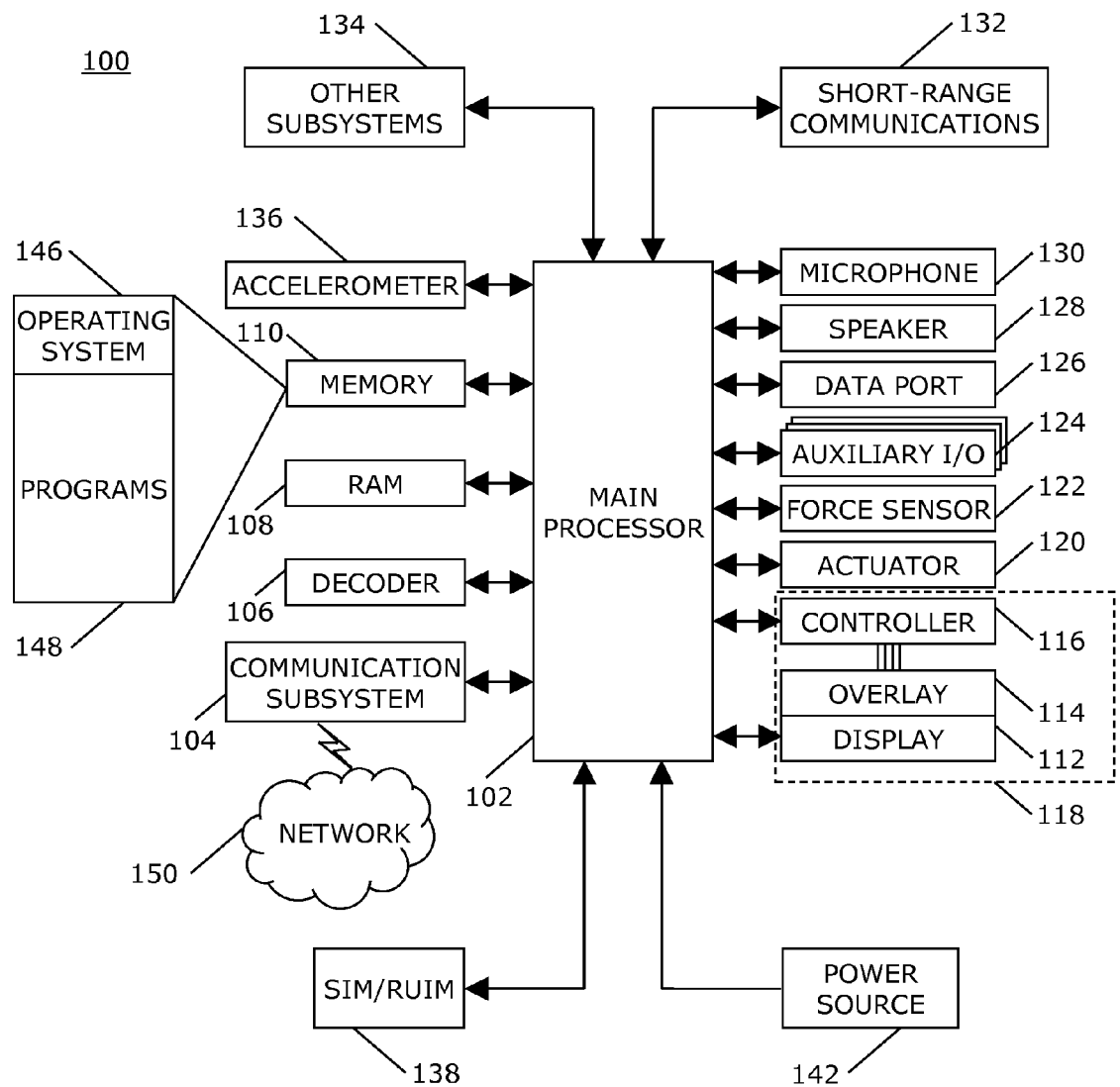
FIG. 1 is a block diagram of a portable electronic device in accordance with the disclosure.

The following describes an apparatus for and method of touch-sensitive control on a touch-sensitive display. The apparatus may be an electronic device. The electronic device displays information and at least two controls on the touch-sensitive display. Touch associated with the controls, results in moving an indicator through the information in at least a first direction and a second direction. The controls do not move with the movement of the indicator. In another example, the electronic device detects at least two touches on the touch-sensitive display that overlap at least partially in time. When the electronic device detects release of one of the touches, an editing control is displayed on the touch-sensitive display. When the electronic device detects release of the other of the touches, a virtual keyboard is displayed to replace the display of the editing control.

The following describes a method and apparatus to control an electronic device. The apparatus may be a portable electronic device that includes a touch-sensitive display. The electronic device displays information and, for example, a virtual keyboard on the touch-sensitive display. In response to an invocation, the electronic device displays an enlargement of at least part of the information to replace at least part of the information displayed, such as a virtual keyboard. The electronic device moves an indicator in the enlargement in response to detecting a touch on the touch-sensitive display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Input via a graphical user interface is provided via the touch-sensitive overlay 114. The processor 102 interacts with the touch-sensitive overlay 114 via the electronic controller 116. Information, such as text, characters including spaces, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts or touch events, may be detected by the touch-sensitive display 118. The processor 102 may determine attributes of the touch, including a location of a touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable input member, such as a finger, thumb, appendage, or other objects, for example, a stylus, pen, or other pointer, depending on the nature of the touch-sensitive display 118. Multiple simultaneous touches may be detected.

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

When viewing information on an electronic device, e.g., information input to or received by the electronic device, a user may choose to manipulate the information. For example, a user may choose to edit information by copying, cutting, deleting, or pasting information, for which moving an indicator through the information, highlighting parts of the information, moving the information, and so forth is advantageous. An indicator includes, for example, a cursor, a blinking character, a colored area, an insertion marker, highlighting, and so forth. Fine control or movement of an indicator through information is facilitated through input such as one or more detected touches associated with one or more controls displayed on a touch-sensitive display, although the touch-sensitive display may be unable to provide such fine control due to coarse touch sensitivity. For example, a user may have difficulty touching a position between a first displayed character and a second displayed character on a touch-sensitive display. To support the manipulation of information, touch-sensitive controls are displayed to facilitate movement of an indicator through the information, which indicator may indicate a single position with the text or highlight multiple characters of text. One or more controls may be provided to move the indicator in one or more directions through the information. Each control may move the indicator in all possible directions, in one direction, or in a subset of all the possible directions. Each control may provide the same functionality, e.g., moving the indicator in the same direction(s), or the controls may provide different functionality from one another, e.g., moving the indicator in different directions, such as up and down or left and right. The one or more controls may be displayed at or near one or more sides of the electronic device to facilitate use of one or both hands to interact with the electronic device.

When at least two touches are detected on the touch-sensitive display, and release of one of the touches is subsequently detected, an editing control is displayed on the touch-sensitive display. Advantageously, the at least two touches at least partially overlap in time. The editing control may be displayed until release of another of the remaining touches is detected, until a menu option or selection option is selected, after a time period of no detected activity, and so forth. Optionally, a virtual keyboard may be displayed to replace the editing control when the release of the additional one of the two or more touches is detected. The editing control is an individual control or group of controls that provide editing functions. The editing control may include one or more controls for moving an indicator, one or more selection options to facilitate performing cut, copy, delete, and paste functions, one or more selection options to highlight information, and so forth. While typing on a virtual keyboard, multiple input members may be at or near the virtual keyboard displayed on the touch-sensitive display 118. Because the at least two touches may be at locations associated with the virtual keyboard, the edit controls may be quickly accessed during typing on the virtual keyboard.

Figure 2:
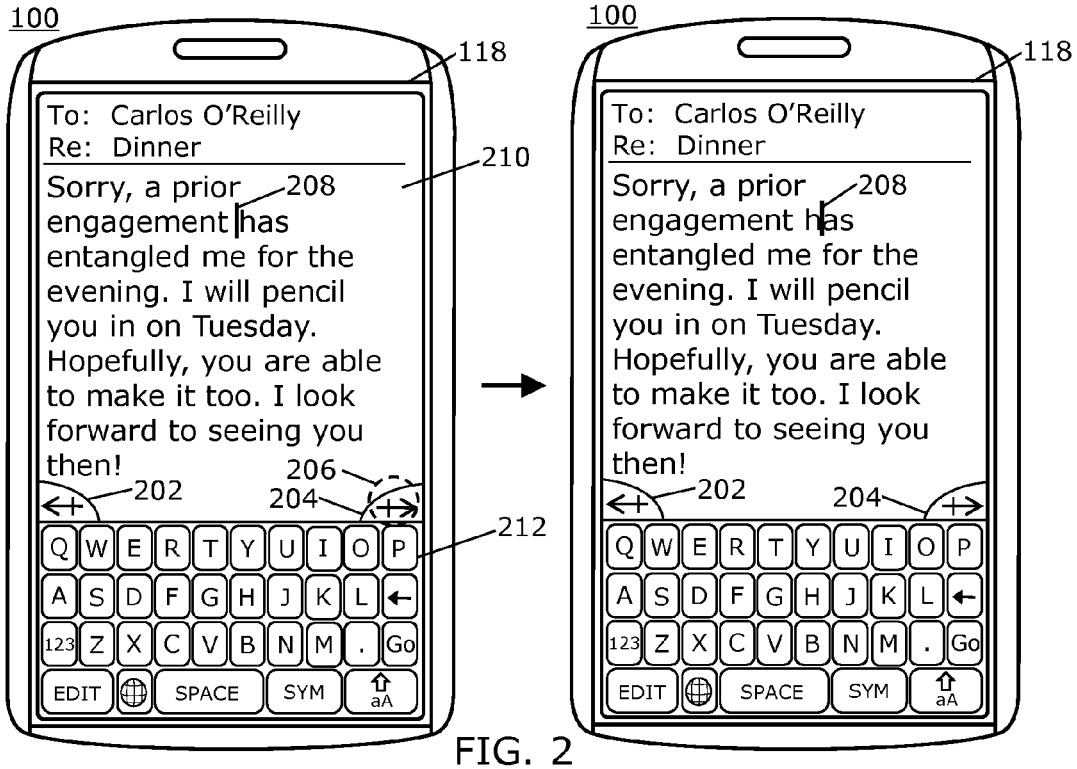
FIG. 2, FIG. 3, FIG. 4, FIG. 5, FIG. 7, FIG. 8, FIG. 12, FIG. 13, and FIG. 14 illustrate examples of displaying touch-sensitive controls on an electronic device in accordance with the disclosure.

Touch-sensitive controls are displayed on the touch-sensitive display 118 as shown in the example of FIG. 2. In the left device 100 of FIG. 2, a first control 202 and a second control 204 are displayed on the touch-sensitive display 118. The controls 202, 204 may optionally have a default control direction, such as indicated by a displayed arrow as shown in FIG. 2. For example, a touch such as a tap at a location associated with the controls 202, 204, results in moving the indicator in the default direction associated with the one of the controls 202, 204 with which the touch is associated. For example, when a touch, such as a tap, associated with the first control 202 is detected, an indicator 208 moves to the left by one character through displayed information 210, in the default direction for the first control 202. Optionally, the indicator 208 may move by more than one character, at least one word, at least one sentence, at least one paragraph, at least one page, and so forth. A touch such as a tap at location 206 is associated with the second control 204 and results in moving the indicator 208 to the right through the information 210 by one character, in the default direction for the second control 204. In the example shown in FIG. 2, the touch at the location 206 is a tap that results in the indicator 208 moving from the position shown on the left device 100 to the position shown on the right device 100. The default direction associated with each of the controls 202, 204 may be up, down, left, right, up and left, up and right, down and left, down and right, and so forth. Controls may have a default direction but need not have a default direction. Although the default direction associated with the controls 202, 204 is invoked in the above example with a tap, any type of touch may result in a movement in the default direction, such as a double tap, flick, swipe, hovering or held touch, and so forth. Although two controls 202, 204 are shown in FIG. 2, any number of controls may be displayed.

The first control 202 is displayed adjacent to a virtual keyboard 212 and on the left side of the display 118, which may facilitate easy use or operation by a finger of a left hand. The second control 204 is displayed adjacent to the virtual keyboard 212 and on the right side of the display 118, which may facilitate easy use by a finger of a right hand. Other locations for the controls may also be successfully implemented, including locations in the non-display area of the touch-sensitive display 118. For example, the controls 202, 204 may be at or near a location where a touch was recently detected, at or near a position where information is not currently displayed, at or near an outer edge of the display 118, away from an edge of the display 118, and so forth.

Although an example shape of the controls 202, 204 is shown in FIG. 2, the controls 202, 204 may be any shape or design. A touch associated with the controls 202, 204 may be detected while the controls 202, 204 are displayed, are displayed with any opaque or translucent or see-through level, are associated with a location in the non-display area, and so forth. For example, the controls 202, 204 may be temporarily displayed to indicate the location of the controls 202, 204, and the controls 202, 204 may cease to be displayed, e.g., to facilitate the display of other information on the display 118. Alternatively, indications of the location of the controls 202, 204 may be utilized, such as when the controls 202, 204 are located in the non-display area.

The controls 202, 204 are stationary in that they do not move when the indicator 208 moves. The controls 202, 204 may be displayed in an area outside the area in which the information 210 is displayed, may be displayed in the area in which the information 210 is displayed, may be displayed adjacent to the area in which the information 210 is displayed, may be displayed to replace a part of the information 210, and so forth. The controls 202, 204 may optionally be moved to different locations. For example, the controls 202, 204 may move based on a location of a touch, may move based on a setting specifying a location for the controls 202, 204, may move based on movement of the indicator 208, may move based on the position of information displayed on the display 118, and so forth.

Figure 3:
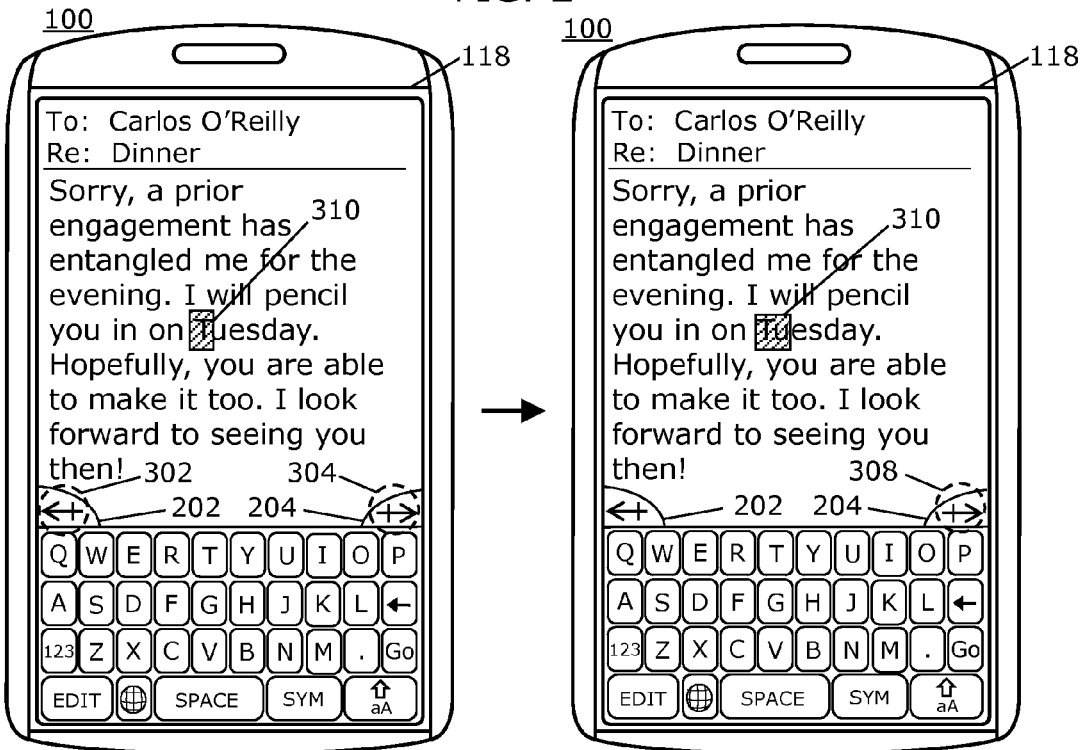

In the example of FIG. 3, the electronic device 100 detects touches at two locations 302, 304, wherein these touches at least partially overlap in time. The first touch location 302 is associated with the first control 202 and the second touch location 304 is associated with the second control 204. For example, the touches may overlap in time for 200 milliseconds, 0.75 seconds, 1.25 seconds, or any other suitable period of time. In the left device 100 of FIG. 3, highlighting 310 is initiated, e.g., an end of the highlighting is established. Any other action, e.g., cut, copy, delete, paste, may optionally be performed in response to detecting that the touches at locations 302, 304 overlap in time. Detection of a third touch at a location 308 associated with the second control 204, as shown in the right device 100, results in extending the highlighting by one character to the right as shown on the right device 100 in this example. The end characters of the highlighting 310 may be moved, e.g., ends of the highlighting may be changed, in any direction by one or more touches associated with the first control 202 and/or the second control 204.

In other examples, after initiating highlighting 310, a first indicator may be moved in response to detection of a touch associated with the first control 202 and a second indicator may be moved in response to detection of a touch associated with the second control 204. In such an example, the highlighting 310 selects a part of the information 210 that is between the first indicator and the second indicator.

Figure 4:
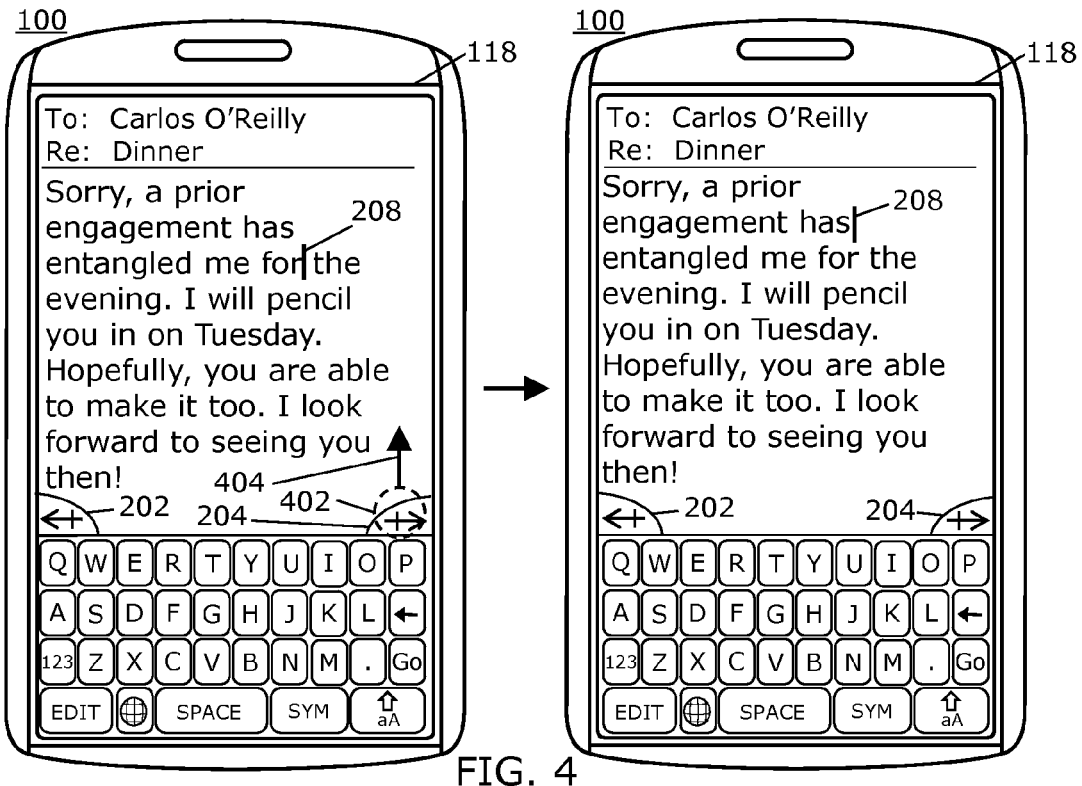

The controls 202, 204 function as virtual joysticks in the examples shown in the figures. For example, functioning as a virtual joystick includes detecting movement of a touch associated with the virtual joystick and moving an indicator in response to the detected movement; the movement may be in any direction; maintaining a touch at a fixed location continues to move the indicator along the current direction of movement, and other physical joystick-like functionality. Optionally, the touch associated with the virtual joystick may move in multiple directions before the touch is released. In the example shown in FIG. 4, a touch that originates at a location 402 associated with the second control 204 moves upward in the direction associated with the arrow 404, the indicator 208 is moved from the position after "for" shown on the left device 100 to the position after "has" shown on the right device 100. The indicator 208 is generally moved in a direction based on the direction of movement of the touch, e.g., the indicator 208 may be moved in the same direction as the movement of the touch, in the opposite direction as the direction of the touch, e.g., as in an airplane control, and so forth.

The indicator 208 may continue to move, for example, as long as the touch continues/continues to move, until the touch is released, or until the touch returns to the original location 402. The touch may move in any direction, including multiple directions, resulting in the indicator 208 being moved in the same direction(s) along with the movement of the touch.

Optionally, the further the touch moves from the original location 402 of the touch, the faster, further, and so forth the indicator 208 is moved, e.g., the faster the movement of the indicator repeats. The indicator 208 may alternatively move at a constant speed regardless of the distance that the touch moves. The indicator 208 may move at a speed substantially the same as the speed of movement of the touch. Alternatively, the indicator 208 may move a distance based on the distance of the movement of the touch. For example, when the touch moves a distance of the height of two lines of characters, the indicator 208 moves two lines of characters, the indicator 208 moves four lines of characters, or any other proportional movement.

Figure 5:
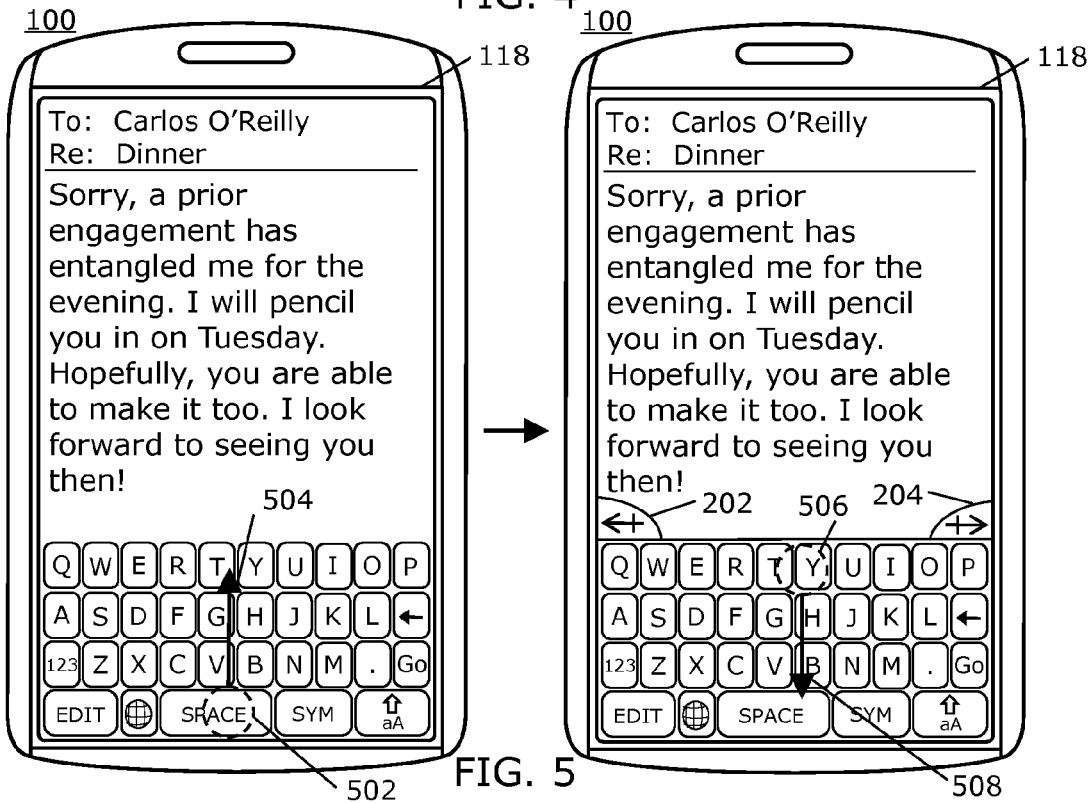

The controls 202, 204 may be displayed in accordance with the example of FIG. 5. Optionally, a gesture in the area where a keyboard is displayed may be utilized to display the controls 202, 204, and a gesture in the opposite direction discontinues display of the controls 202, 204. As shown on the left device 100 in this example, a touch that is a swipe is detected beginning at a location 502 and moves in the direction of the arrow 504 while the controls 202, 204 are not displayed. The controls 202, 204 are displayed in response as shown on the right device 100. A touch that is a swipe is detected beginning at a location 506 and moves in the direction of the arrow 508 while the controls 202, 204 are displayed in this example, and the controls 202, 204 are no longer displayed on the display 118 in response to this detection. Although the movement of the touches in these examples is up and down, the display of the controls 202, 204 may be provided in response to detecting movement such as a swipe in any direction(s). Any type of touch may be detected to provide the display of the controls 202, 204. For example, two or more separate touches at any different locations may be detected. Optionally, the controls 202, 204 may be displayed when a touch associated with the information 210 is detected.

Figures 6, 11:
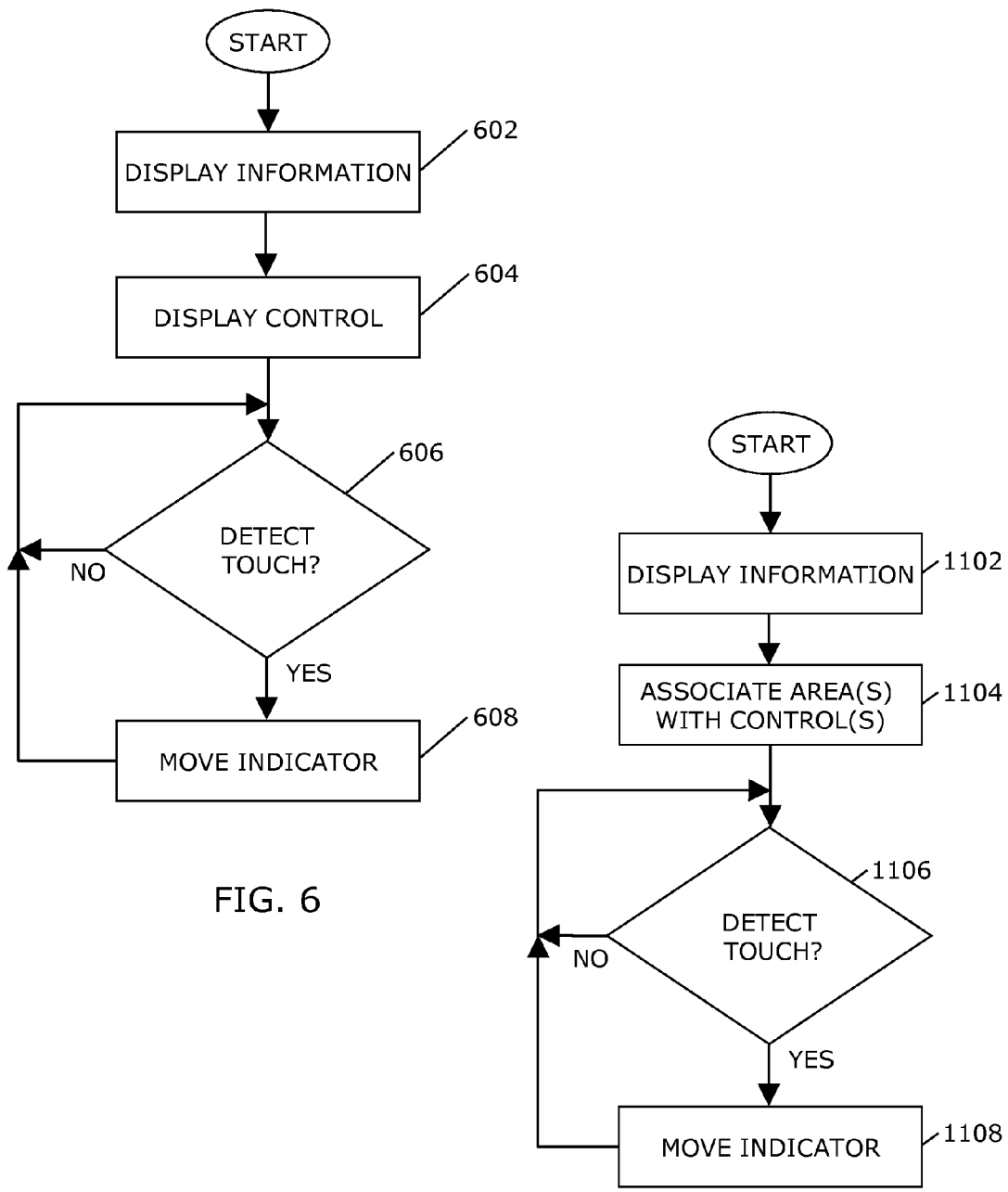
FIG. 6, FIG. 9, and FIG. 11 are flowcharts illustrating methods of touch-sensitive control on an electronic device in accordance with the disclosure.

A flowchart illustrating a method of touch-sensitive control is shown in FIG. 6. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

Information is displayed 602 on the touch-sensitive display 118. An indicator such as described above is optionally displayed within the information. The information 210 may be information input into the portable electronic device 100 or received in a communication by the portable electronic device 100, e.g., an electronic mail message (e-mail), a short message service (SMS) message, a webpage, a document, a calendar event, a contact, and so forth.

One or more controls are displayed 604 on the touch-sensitive display 118. The controls may be, for example, the controls 202, 204 shown in FIG. 2, FIG. 3, FIG. 4, and FIG. 5, or any other controls. When a touch associated with one of the controls 202, 204 is detected 606, the indicator 208 is moved 608 through the information in accordance with the touch characteristics, e.g., type and direction. The touch may move in any direction, including multiple directions, resulting in the indicator 208 being moved in the same direction(s) along with the movement of the touch. For example, a detected touch associated with the first control 202 results in moving the indicator 208 through the information 210 in a first direction and a second direction as shown in the example of FIG. 2. A detected touch associated with the second control 204 may result in moving the indicator 208 through the information 210 in the first direction and the second direction. A first touch associated with the first control 202 and a second touch associated with the second control 204 may result in the indicator 208 moving in the same direction. For example, when a touch associated with the second control 204, as shown in FIG. 2, is detected 606, the indicator is moved 608 in the right direction. When a gesture indicating movement to the right, e.g., a swipe to the right, associated with the first control 202 is detected 606, the indicator 208 is also moved 608 to the right. Example gestures include a swipe, a tap, a double tap, a flick, and so forth. The gesture may indicate movement in any direction.

The detection 606 and movement 608 may be repeated any number of times. Although a first direction and a second direction are discussed above, any number of directions may be associated with the controls displayed at 604. The movement 608 may be up, down, left, right, or any combination of directions.

Touch-sensitive controls are displayed to facilitate the movement of an indicator through information displayed on a touch-sensitive display of an electronic device. The touch-sensitive controls facilitate fine control of movement of the indicator, which is advantageous when an input device, such as a touch-sensitive display, has limited or coarse sensitivity, such as limited ability to locate a touch at a specific point on a display. Multiple controls for moving the indicator in the same directions or different directions may be displayed to facilitate the detection of touches that do not overlap in time and touches that at least partially overlap in time. For example, a detected touch associated with a first control results in moving the indicator in four directions and a detected touch associated with a second control may result in moving the indicator in the same four directions. A touch associated with the first control may result in movement of the indicator in one direction, e.g., the up direction, and a touch associated with the second control may result in movement of the indicator in another direction, e.g., to the right. The touch may be a tap, a flick in a direction, touch and movement associated with a virtual joystick, a gesture in a direction, multiple touches, and so forth. When the first touch and the second touch at least partially overlap in time, the movements may be performed substantially simultaneously, e.g., movement up and to the right. Touches on both controls that overlap in time may also result in other events and/or actions such as initiation of highlighting, selection, and so forth.

Although examples described in connection with FIG. 2, FIG. 3, FIG. 4, FIG. 5, and FIG. 6 include touches associated with a particular one of the controls 202, 204 and a resulting action, the touch and the resulting action may alternatively be associated with the other of the controls 202, 204 or any other control. Although the method of FIG. 6 is described with reference to FIG. 2, FIG. 3, FIG. 4, and FIG. 5, the method is applicable to any electronic device.

Figure 7:
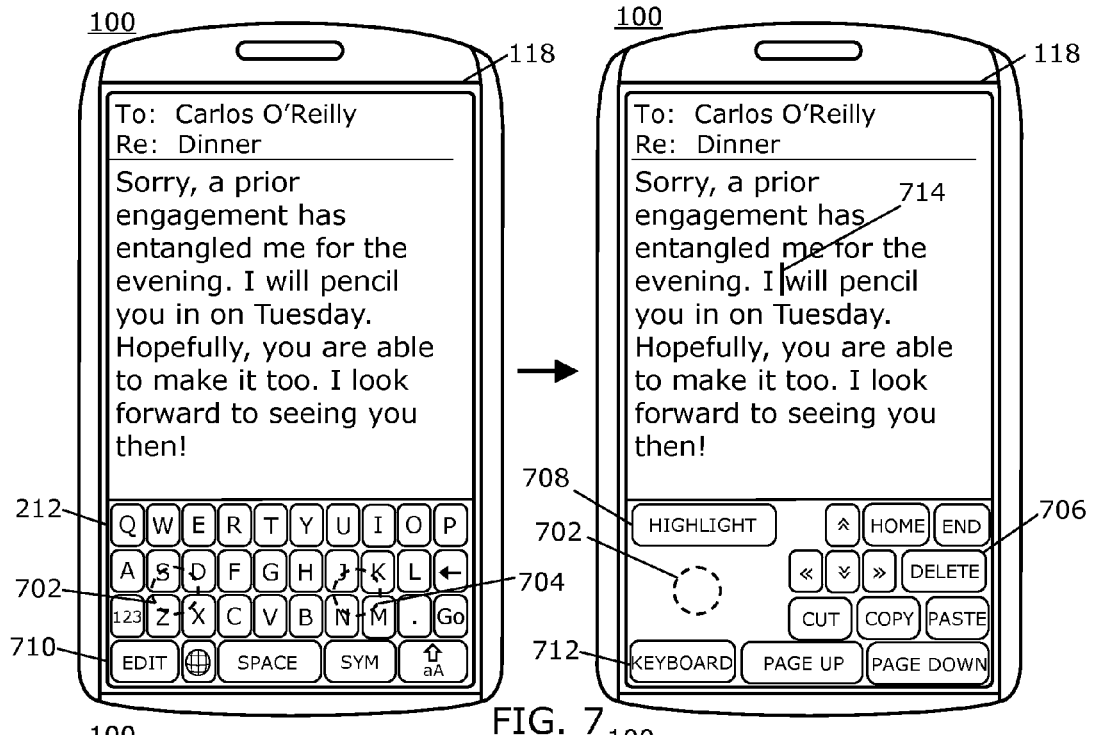

An alternative editing control is displayed on the touch-sensitive display 118 of the electronic device 100 as shown in the example of FIG. 7. As shown on the left device 100 of FIG. 7, a touch is held at one location 702, referred to as a hold touch, and a touch detected and released at a second location 704, referred to as a release touch, are detected in an area associated with a virtual keyboard 212. The hold touch and the release touch overlap partially in time, and the release touch ends prior to the hold touch. Alternatively, the hold touch and the release touch may be associated with any other area of the touch-sensitive display 118. Alternatively, the hold touch and the release touch may be associated with physical buttons or keys such as keys of a physical keyboard or keys along the housing of the device 100. Although the hold touch location 702 is to the left of the release touch location 704, the locations 702, 704 of the touches may be at any locations on the touch-sensitive display 118, e.g., both may be located in an area in which the virtual keyboard 212 is displayed, both may be located in an area in which information is displayed, one may be located in the area of the keyboard 212 and another in the area in which the information is displayed, and so forth.

As shown on the right device 100 in the example of FIG. 7, when the release touch is released, editing control 706 including a highlight selection option 708 are displayed. As shown in FIG. 7, the editing control 706 is displayed at or near the end location 704 of the release touch, which is on a right side of the display 118 in the example shown on the right device 100 of FIG. 7. In other examples, the editing control 706 may be displayed in any location such as at or near a left side of the display 118 when the release touch has an end location on the left side of the display 118, may be displayed at or near a center of the touch-sensitive display 118, may be displayed in an area in which the virtual keyboard 212 was previously displayed, may be displayed at any location associated with an end location for a touch, at any location associated with an origin location of a touch, at or near a location opposite an origin location or end location of a touch, and so forth. The editing control 706 may be in an editing window, an editing area, and so forth.

The editing control 706 shown in the example of FIG. 7 includes selection options for the editing functions CUT, COPY, PASTE, and DELETE. The editing control may include more or fewer selection options, controls, and so forth. Additional selection options include, for example, END, HOME, PAGE UP, PAGE DOWN, SEND, GO, and SPELL. An indicator 714 is also displayed within the information. The indicator 714 may be displayed whenever the information is displayed, only when the editing control 706 is displayed, and so forth.

The editing control 706 also includes selection options or controls designated with arrows for up, down, left, and right directions relative to information displayed or the device 100. A detected touch, e.g., a tap, associated with the directional selection options results in moving an indicator one character through information in the direction associated with the associated directional selection option. A gesture associated with a directional selection option results in moving the indicator multiple characters through the information in the direction associated with the directional selection option. For example, when a swipe associated with a right directional selection option is detected, the indicator is moved from a first word to the start of a second word to the right of the first word. The indicator may be moved through one or more characters of the first word and through a space to the start of the second word. Alternatively, a swipe associated with an up directional selection option results in moving the indicator to a start of a paragraph within which the indicator is located. Any other type of gesture may be detected. Any other action may be associated with a detected gesture. A touch associated with a directional selection option results in moving the indicator a single character and a gesture associated with the directional selection option results in moving the indicator multiple characters. Optionally, a touch associated with a directional selection option results in moving the indicator multiple characters and a gesture associated with the directional selection option results in moving the indicator a single character. Although movement of the indicator through the information is discussed, the electronic device 100 may determine a position to which the indicator is to be moved and may display the indicator at that location rather than moving the indicator through the information.

Any other controls may be included with the editing control 706 such as any other editing control, any other keyboard key, and so forth. The editing control 706 may be a toggle button, a switch, a drop-down menu, a virtual trackpad, a virtual joystick, a virtual directional pad (D-pad), any combination of the foregoing, and so forth.

A detected touch associated with the highlight selection option 708 is detected to initiate and end highlighting of information in this example. When the highlight selection option 708 is selected, e.g., a touch associated with the highlight selection option 708 is detected, a detected touch associated with an editing control for moving the indicator, e.g., a directional selection option, results in highlighting information. For example, when selection of the highlight selection option 708 is detected, an end point for highlighting is initiated at the position of the indicator 714 in the information and is moved as a result of a detected touch associated with an editing control. A subsequent selection of the highlight selection option 708 may result in initiating a different (another) end point for the highlighting. The highlighting may remain while the highlight selection option 708 is selected, e.g., while a touch is detected, until a second touch associated with the highlight selection option 708 is detected, and so forth. The highlighting may end when the highlighting selection option 708 is not selected, e.g., when a touch is released, when the highlight selection option 708 is selected a second time to toggle the highlight selection option 708, and so forth. Alternatively, the highlighting may remain when the highlight selection option 708 is not selected, e.g., the highlighting may remain until another editing control is selected, until the editing control is no longer displayed, and so forth. The highlight selection option 708 may behave similarly to the SHIFT key on a keyboard. This process may be utilized to select or change an end point for the highlighting.

The highlight selection option 708 may be displayed at or near the location 704 of the release touch to facilitate easy selection of the highlight selection option by the input member of the release touch. The highlight selection option 708 is optionally displayed at or near the location 702 of the hold touch to facilitate easy selection of the highlight selection option 708 by the input member of the hold touch. For example, the input member of the hold touch may move along the display 118 to the highlight selection option 708 to select the highlight selection option 708. The highlight selection option 708 may be displayed in any other location on the display 118. Although the highlight selection option 708 shown in FIG. 7 is displayed as a key or button, highlighting may be engaged or disengaged by a drop-down menu, a physical key, a radio button, a slider, an option button, a menu, a checkbox, and so forth.

The selection options 710, 712 in the example of FIG. 7 may optionally toggle between display of the virtual keyboard 212 and display of the editing control 706, may toggle display of other selection options or controls, and so forth. For example, the EDIT selection option 710 initiates display of the editing control 706 as shown on the right device 100 of FIG. 7. The KEYBOARD selection option 712 may initiate display of the virtual keyboard 212 as shown on the left device 100. The display controls 710, 712 may be selected as an alternative to using the hold touch and the release touch to toggle display of the editing control. The selection options 710, 712 may be associated with the hold touch and the release touch. For example, after detection of the hold touch and the release touch results in the display of the editing control 706, a touch associated with the display selection option 712 results in display of the virtual keyboard 212 to replace the display of the editing control 706.

Release of the hold touch results in display of the virtual keyboard 212 instead of the editing control 706. The editing control 706 may be displayed while the hold touch is detected until the hold touch is released, and thus is no longer detected. Alternatively, a touch associated with the KEYBOARD selection option 712 may result in display of the virtual keyboard instead of the editing control 706. The hold touch may optionally move to any location on the touch-sensitive display 118. Release of the hold touch may alternatively result in display of any other selection options or controls.

Figure 9:
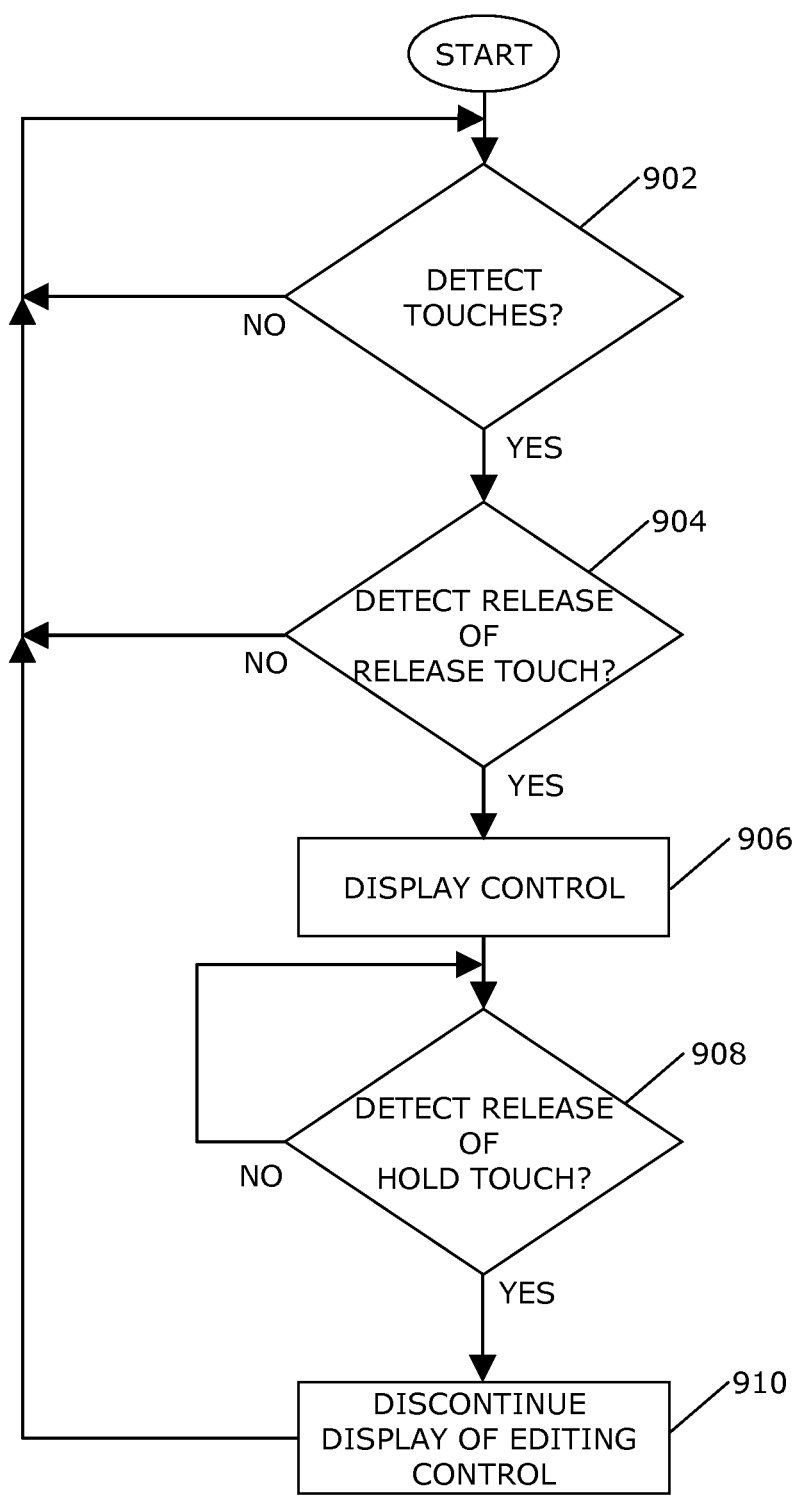

A flowchart illustrating a method of touch-sensitive control including displaying an editing control on the touch-sensitive display 118 is shown in FIG. 9. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

When a hold touch and a release touch are detected 902 and release of the release touch is detected 904, an editing control is displayed 906. The hold touch may be the hold touch at location 702 and the release touch may be the release touch at location 704 of the examples of FIG. 7 and FIG. 8. The hold touch and the release touch may be any other touch or gesture. The electronic device 100 may determine that the hold touch and the release touch at least partially overlap in time, e.g., for 0.5 seconds, 1 second, or any other suitable time. Further, determining that the hold touch and the release touch at least partially overlap in time may include detecting that the hold touch and the release touch overlap in time for at least a time value. The time value may be any threshold amount of time that may be established by a manufacturer of the electronic device 100, by a programmer of the electronic device 100, by a user of the electronic device 100, and so forth. Detecting that the hold touch and the release touch overlap in time for at least a time value may prevent detection of two or more touches that are not intended to initiate display of the editing control, e.g., multiple touches that are intended to select keys of the virtual keyboard, inadvertent touches, and so forth.

Figure 8:
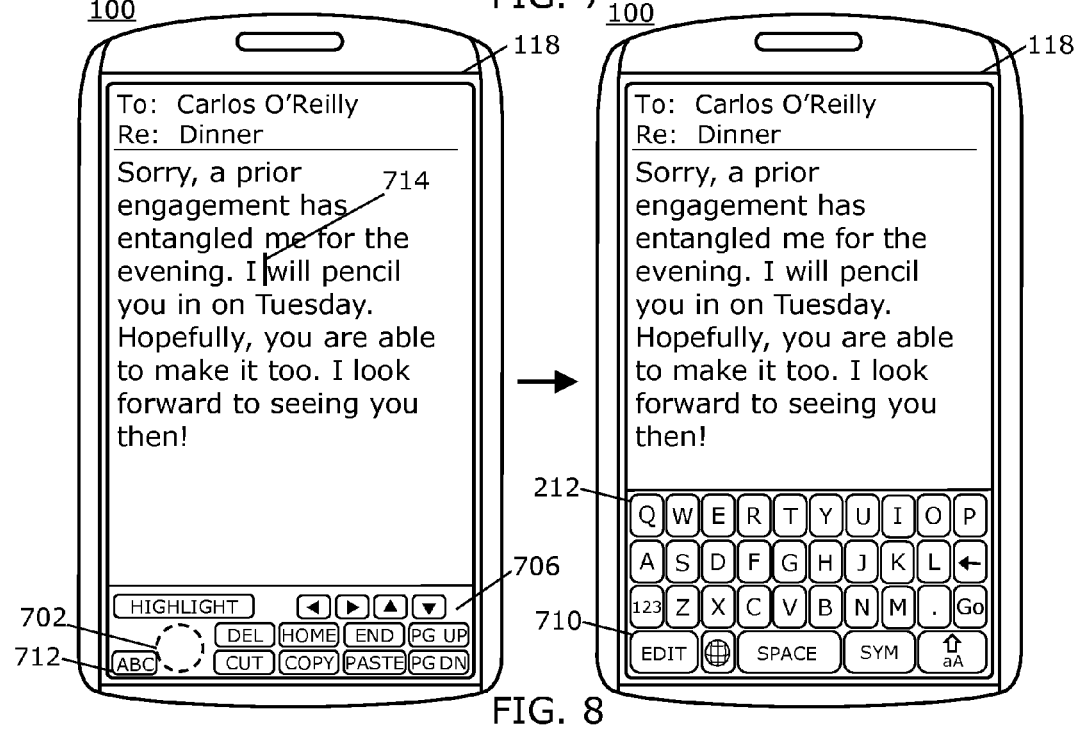

The editing control displayed at 906 may be the editing control 706 and the highlight control 708 of the examples of FIG. 7 and FIG. 8. Alternatively, the editing control may include any number and type of controls, such as one or more selection options for editing information, one or more controls for inputting information, e.g., a SPACE key, a keyboard key, and so forth, one or more controls for moving an indicator through information, and so forth.

When release of the hold touch is detected 908, display of the editing control is discontinued 910. For example, as shown in the example of FIG. 8, the display of the editing control 706 and the highlight control 708 is replaced by display of the virtual keyboard 212. The display of the editing control may be replaced by any display such as display of information, display of a background, display of one or more controls, and so forth.

Although display of an editing control is initiated by the combination of the hold touch and the release touch as shown in FIG. 9, any other display or action may be initiated by the combination of the hold touch and the release touch. For example, the first control 202 and the second control 204 as shown in FIG. 2 are displayed at 906 in response to detection at 902, 904 of the combination of the hold touch and the release touch. Although the method of FIG. 9 is described with reference to FIG. 7 and FIG. 8, the method is applicable to any other electronic device.

Figure 10:
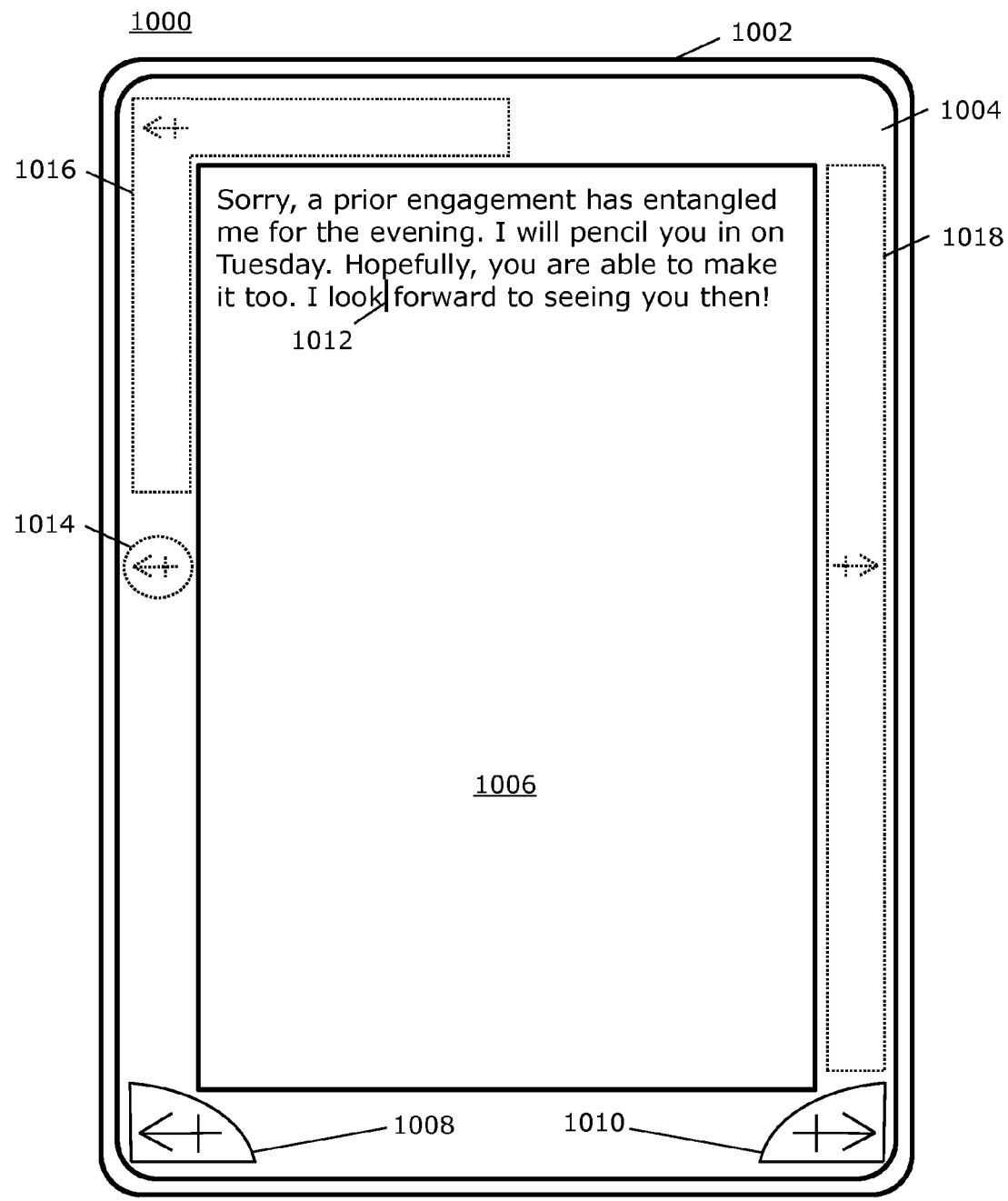
FIG. 10 illustrates an example of touch-sensitive controls on an electronic device in accordance with the disclosure.

In the example of FIG. 10, the electronic device 100 is a tablet 1000. As shown in the example of FIG. 10, the tablet 1000 includes a touch-sensitive display 1002 that includes a non-display area 1004 and a display area 1006. The tablet 1000 includes a first control 1008 and the second control 1010 positioned in the non-display area 1004. While the controls 1008, 1010 are shown in FIG. 10, the controls 1008, 1010 are not displayed because they are associated with the non-display area 1004. In this example, touch sensors are disposed in the non-display area 1004. The controls 1008, 1010 may operate in the same manner as the controls 202, 204 of FIG. 2, FIG. 3, FIG. 4, and FIG. 5. For example, a touch associated with the first control 1008 moves the indicator 1012.

A marker may be displayed in the display area 1006 of the touch-sensitive display 1002 to indicate the positions of the controls 1008, 1010 in the non-display area 1006. The touch-sensitive display 1002 may display the indicator at or near the border of the display area 1006 adjacent to the positions of the controls 1008, 1010. The indicator may be a line, a symbol, an icon, a bar, an arrow, and so forth. A light emitting diode or other small visual indicator may be disposed under the non-display area 1004 to indicate the control location. The areas associated with the controls 1008, 1010 may be anywhere in the non-display area 1004, for example, next to the display area 1006.

FIG. 10 also illustrates optional locations for the controls 1008, 1010 in the non-display area 1004. The control 1014 is at or near the center of a side of the non-display area 1004. One or more controls may be positioned at or near the center of any of the other sides of the non-display area 1004. Control 1016 is positioned at a corner of the non-display area 1004. One or more controls may be positioned at any other corner of the non-display area 1004. Control 1018 extends along substantially an entire length of a side of the non-display area 1004. One or more controls may extend along other sides of the non-display area. Any combination of the example controls 1008, 1010, 1014, 1016, and 1018 may be provided. A control may comprise a substantial area of the non-display area 1004 to facilitate selection of the control, e.g., substantially an entire side of the non-display area 1004, an area larger than an area encompassed by a touch, and so forth. Optionally, a control may be associated with an area at or near a location of a touch detected in the non-display area.

A flowchart illustrating a method of touch-sensitive control is shown in FIG. 11. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

Information is displayed 1102 in the display area 1006 of the touch-sensitive display 1002. An indicator such as described above is optionally displayed within the information. The information may be information input into the tablet 1000 or received in a communication by the tablet 1000, e.g., an electronic mail message (e-mail), a short message service (SMS) message, a webpage, a document, a calendar event, a contact, and so forth.

One or more controls are associated 1104 with areas of the non-display area 1004 of the touch-sensitive display 1002. The controls may be, for example, the controls 1008, 1010 shown in FIG. 10, which may be substantially similar to the controls 202, 204 shown in FIG. 2, FIG. 3, FIG. 4, and FIG. 5, or any other controls. When a touch associated with one of the controls 1008, 1010 is detected 1106, the indicator 1012 is moved 1108 through the information in accordance with the touch characteristics, e.g., type and direction. The touch may move in any direction, including multiple directions, resulting in the indicator 1012 being moved in the same direction(s) along with the movement of the touch. A first touch associated with the first control 1008 and a second touch associated with the second control 1010 may result in the indicator 1012 moving in the same direction. For example, when a touch associated with the second control 1010, is detected 1106, the indicator is moved 1108 in the right direction. When a gesture indicating movement to the right, e.g., a swipe to the right, associated with the first control 1008 is detected 1106, the indicator 1012 is also moved 1108 to the right.

The detection 1106 and movement 1108 may be repeated any number of times. Although a first direction and a second direction are discussed above, any number of directions may be associated with the controls 1008, 1010. The movement 1108 may be up, down, left, right, or any combination of directions.

Figure 12:
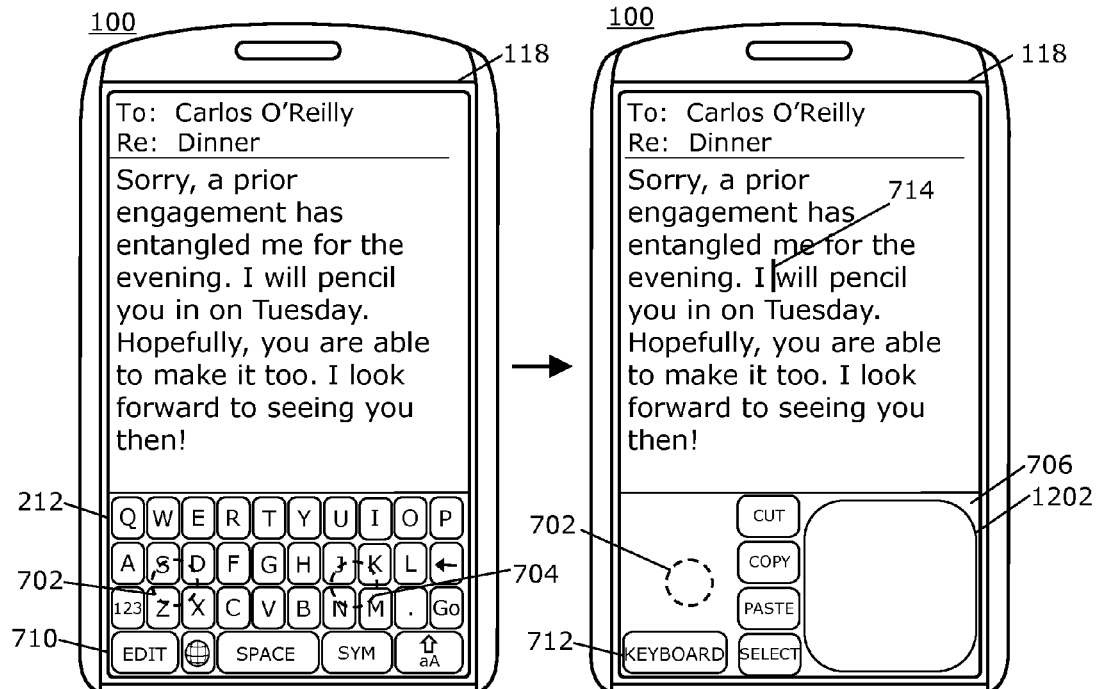

In the example of FIG. 12, the editing control 706 includes a virtual trackpad 1202. The example editing control 706 also includes selection options to facilitate performing cut, copy, paste, and select functions. Additional selection options may be included in the editing control 706. For example, the editing control 706 may include selection options for delete, page up, page down, and so forth. The editing control 706 including the virtual trackpad 1202 are displayed in response to detecting the hold touch at hold touch location 702 and detecting release of the release touch at release touch location 704. When release of the hold touch is detected, display of the editing control 706 including the virtual trackpad 1202 is discontinued. Alternatively, any other touch, gesture, instruction, and so forth may result in display of the editing control 706 including the virtual trackpad 1202. The editing control 706 may be displayed in response to detecting a touch associated with the selection option 710 and display of the editing control 706 may be discontinued in response to detecting a touch associated with selection option 712. The display of the editing control 706 may be discontinued in response to detecting a touch in an area not associated with the editing control 706, e.g., a touch in an area not associated with the virtual trackpad 1202 and not associated with the selection options. The display of the editing control 706 may be discontinued in response to detecting a double tap associated with the virtual trackpad 1202.

The virtual trackpad 1202 is displayed as a border surrounding an area in which touches associated with the virtual trackpad 1202 are detected. Alternatively, any information that identifies the area of the touch-sensitive display 118 associated with the virtual trackpad 1202 may be displayed. The virtual trackpad 1202 and any of the selection options or controls of the editing control 706 may be overlaid over the virtual keyboard 212 such that some or all of the virtual keyboard 212 remains visible. Display of the editing control 706 advantageously replaces the display of the virtual keyboard 212 to increase the amount of the touch-sensitive display 118 available for display of information, e.g., when the editing control 706 is displayed on a portable electronic device. Although the example editing control 706 replaces the display of the virtual keyboard 212 and is displayed within the same dimensions as the virtual keyboard 212, the editing control 706 including the virtual trackpad 1202 may be displayed in any suitable size.

When a touch associated with the virtual trackpad 1202 is detected as a swipe, the indicator 714 is moved in the direction of the swipe. The indicator 714 is moved a distance based on the distance of the swipe. Alternatively, the indicator 714 may be moved a distance that is not based on the distance of the swipe. For example, the indicator may move by one character or other unit for each detected swipe. Any other touch or gesture associated with the virtual trackpad 1202 may be detected and any other action may be performed in response to a touch or gesture associated with the virtual trackpad 1202. For example, a touch at or near a side of the virtual trackpad 1202 may result in moving the indicator 714 in a direction of the associated side, e.g., a touch at or near the top of the virtual trackpad 1202 may result in moving the indicator 714 up, a touch at or near the left side of the virtual trackpad 1202 may result in moving the indicator 714 to the left. For example, a touch at or near the center or a corner of the virtual trackpad 1202 may engage and disengage selection.

A first touch associated with the virtual trackpad 1202 may be detected to move the indicator 714 to a first position in displayed information. A touch associated with the selection option identified "select" may be detected to initiate highlighting. A second touch associated with the virtual trackpad 1202 may be detected to move the second indicator to a second position in the displayed information. The displayed information between the indicator 714 and the second indicator is highlighted.

Figure 13:
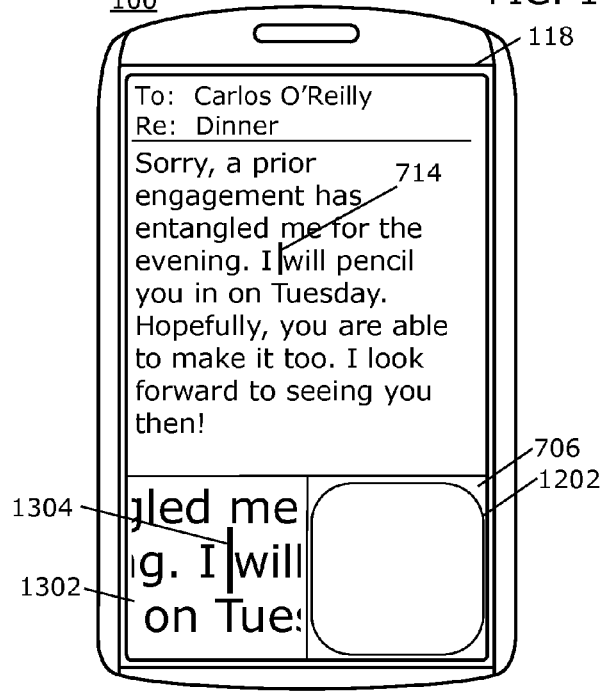

In the example of FIG. 13, the virtual trackpad 1202 may be displayed in conjunction with display of an enlargement of information 1302. The enlargement of information 1302 includes an enlarged display of information as described in further detail below. Alternatively, a second virtual trackpad may be displayed instead of the enlargement, or a second enlargement may be displayed instead of the virtual trackpad. For example, a touch associated with the first virtual trackpad or first enlargement results in moving a first end point of highlighting or a first indicator, and a touch associated with the second virtual trackpad or second enlargement of information results in moving a second end point of highlighting or a second indicator.

Figure 14:
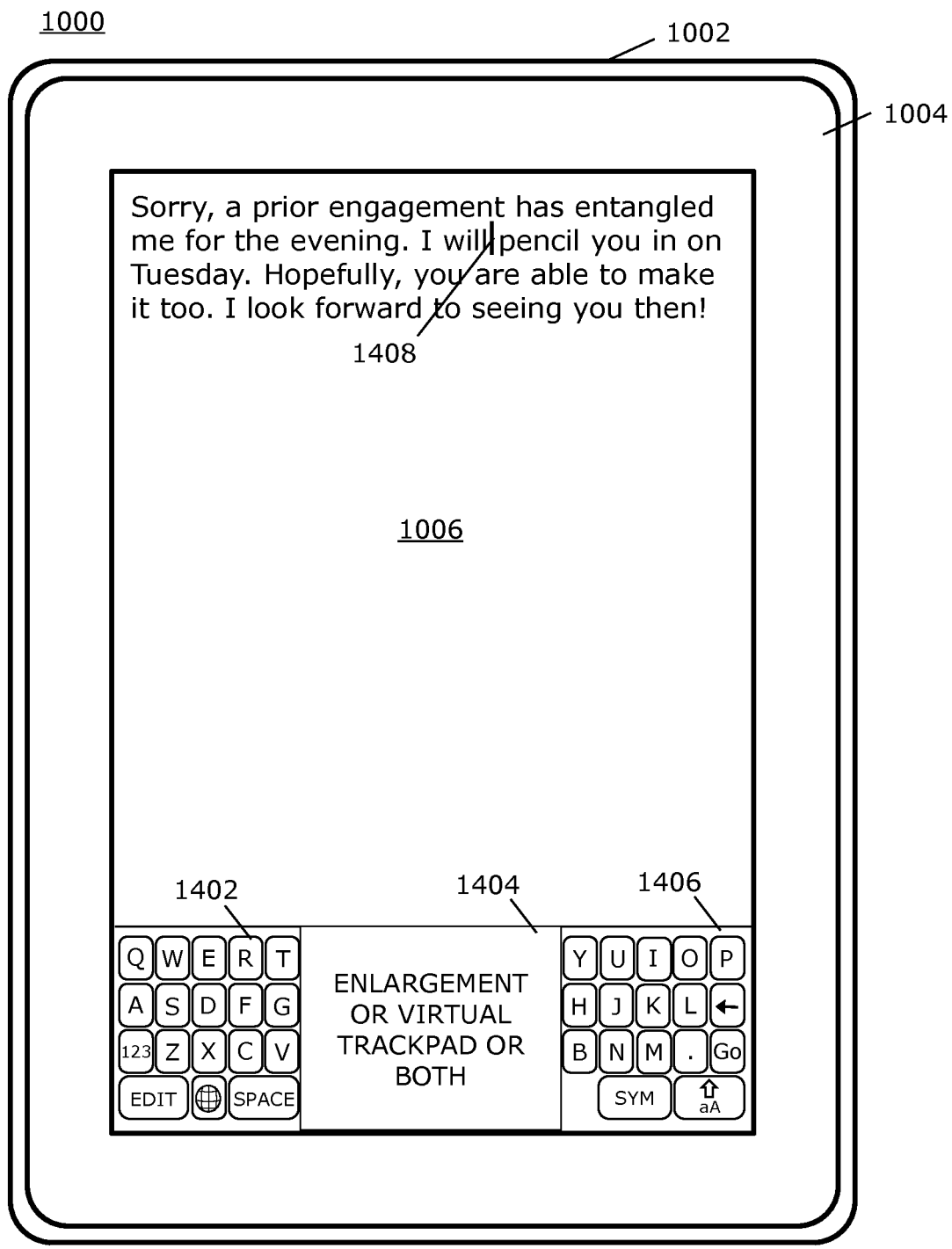

In the example of FIG. 14, one or more enlargements and/or virtual trackpads 1404 are displayed between a left side of a virtual keyboard 1402 and a right side of the virtual keyboard 1406. The enlargement includes an enlarged display of information as described in further detail below. The virtual trackpad 1404 may be implemented as described in conjunction with the virtual trackpad 1202. For example, the one or more enlargements and/or virtual trackpads 1404 may be an enlargement and a trackpad in any order, two virtual trackpads, or two enlargements. Each enlargement or virtual trackpad may control a different end point of highlighting or a different indicator.

For embodiments herein, highlighting may be controlled by receiving input to move and establish a first end point of the highlighting and receiving input to move and establish a second end point of the highlighting. Optionally, input may be received to simultaneously or substantially simultaneously move two end points of the highlighting, e.g., input associated with a first selection option or control may result in moving a first end point of the highlighting and input associated with a second selection option or control may result in moving a second end point of the highlighting. Alternatively, a first end point of highlighting may be fixed, e.g., a first end point may be fixed at a location of an indicator when highlighting is initiated, and input to move and establish a second end point may be received. Optionally, input results in selecting an end point of highlighting for moving.

For embodiments herein, a density of touch sensors may be uniform or may vary throughout the touch-sensitive display 118. For example, the density of the touch sensors may vary between display area(s) and non-display area(s). The density of the touch sensors may be greater in areas where editing controls are provided, e.g., the virtual trackpad 1202; the controls 202, 204, 1008, 1010, 1014, 1016, and 1018; the editing control 706; and so forth. The touch sensors may be disposed in only part(s) of the touch-sensitive display 118. For example, the touch sensors may be disposed at or near a location where the display area meets the non-display area of the touch-sensitive display 118.

A touch-sensitive editing control is displayed to facilitate the movement of an indicator through information displayed on a touch-sensitive display of an electronic device. The touch-sensitive controls are displayed when two touches that at least partially overlap in time are detected and release of one of the touches is detected. The display of the touch-sensitive controls is replaced when release of the other one of the touches is detected. The combination of touches, e.g., the two touches followed by release of a first touch and later release of a second touch, facilitates easier access to the editing control and easier return to a previous display, e.g., a virtual keyboard.

An electronic device comprises a touch-sensitive display and a processor coupled to the touch-sensitive display and configured to display information on the touch-sensitive display, display a first control, wherein a touch associated with the first control results in moving an indicator through the information in a first direction and in a second direction, wherein the first control does not move with movement of the indicator, display a second control, wherein a touch associated with the second control results in moving the indicator through the information in the first direction and the second direction, wherein the first control does not move with movement of the indicator, detect a first touch associated with the first control, in response to the detecting, move the indicator in the first direction, and in response to detecting a second touch associated with the second control, move the indicator in the first direction.

A method comprises displaying information on a touch-sensitive display of an electronic device, displaying a first control, wherein a touch associated with the first control results in moving an indicator through the information in a first direction and in a second direction, wherein the first control does not move with movement of the indicator, displaying a second control, wherein a touch associated with the second control results in moving the indicator through the information in the first direction and in the second direction, wherein the second control does not move with movement of the indicator, detecting a first touch associated with the first control, in response to the detecting, moving the indicator in the first direction, and in response to detecting a second touch associated with the second control, moving the indicator in the first direction. The method may also comprise initiating highlighting of the information in response to detecting the first touch and the second touch.

An electronic device comprises a touch-sensitive display and a processor coupled to the touch-sensitive display and configured to detect a hold touch and a release touch on a touch-sensitive display of an electronic device wherein the hold touch and the release touch overlap at least partially in time, detect release of the release touch, and in response to detecting the release of the release touch, display an editing control while the hold touch is detected. The editing control may include a highlight control for identifying one or more end points in displayed information.

A method comprises detecting a hold touch and a release touch on a touch-sensitive display of an electronic device, wherein the hold touch and the release touch overlap at least partially in time, detecting release of the release touch, and in response to detecting the release of the release touch, displaying an editing control while the hold touch is detected. The method may comprise determining that the hold touch and the release touch overlap in time for at least a first time value. The method may include moving an indicator from a first word to a second word in response to detecting a gesture associated with the editing control.

When viewing information on an electronic device, e.g., information input to or received by the electronic device, a user may manipulate the information, e.g., make changes, move, cut, copy, paste, delete, and perform other functions with the information. For example, a user may edit information by moving an indicator within the information. An indicator includes a cursor, a marker, a blinking character, a pointer, highlighting, and so forth. Editing the information may be difficult when the information is displayed in a small size. For example, portable electronic devices typically include small displays. Coarse input resolution of an input device, such as coarse sensor resolution of a touch-sensitive display may cause difficulty in performing fine selection or movement of an indicator within information displayed in a small size. For example, a user may have difficulty positioning or moving a cursor because accurately touching a position between two characters is difficult. To aid in the manipulation of information, at least part of the information is enlarged or magnified, also referred to as zooming, and displayed on the touch-sensitive display 118. The enlargement may replace at least part of other displayed information, such as a virtual keyboard, virtual keys, controls, or other information, that is displayed on the touch-sensitive display 118.

Figure 15:
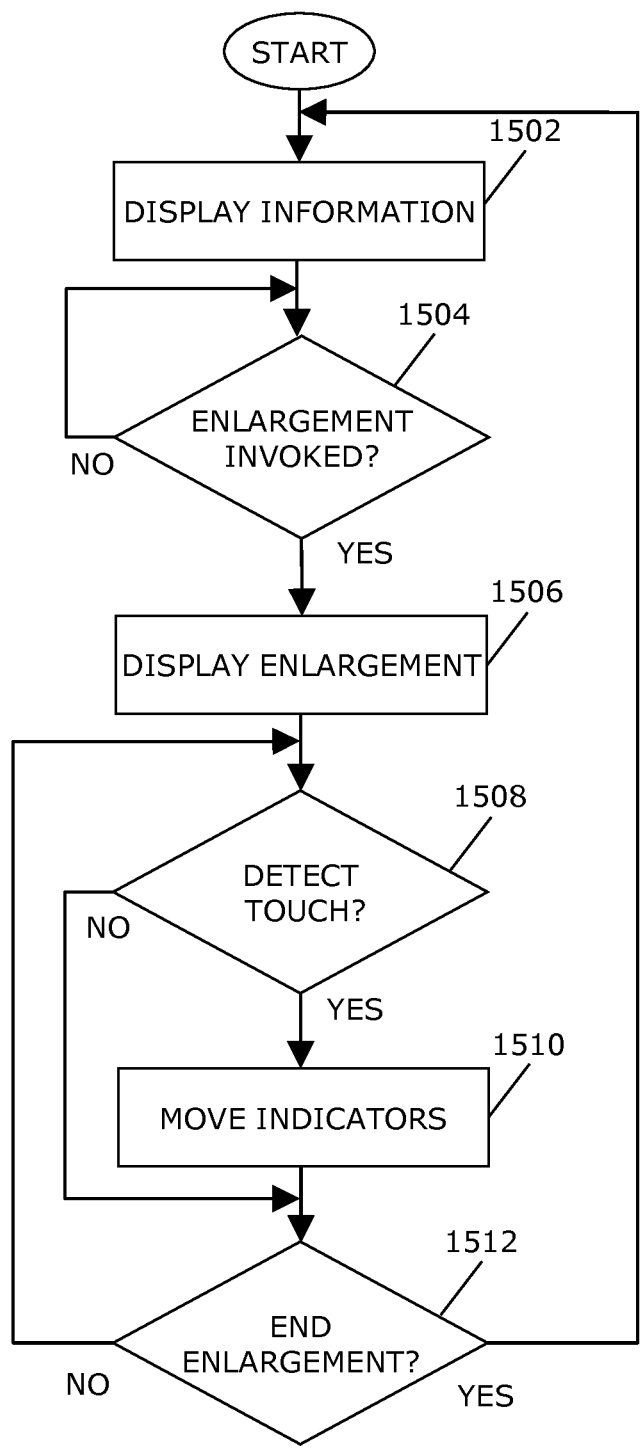
FIG. 15 is a flowchart illustrating a method of displaying an enlargement of information on an electronic device in accordance with the disclosure.

A flowchart illustrating a method of displaying an enlargement of information on the touch-sensitive display 118 is shown in FIG. 15. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

Figure 19:
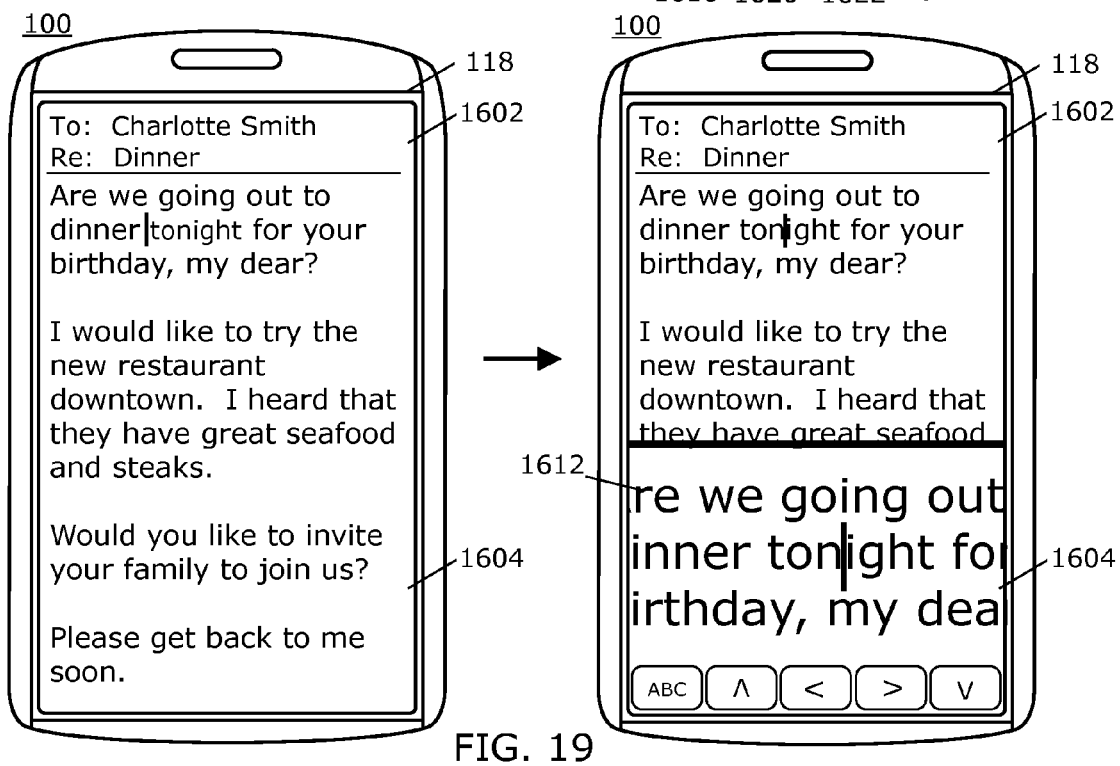

Information is displayed 1502 on the touch-sensitive display 118. Information is displayed in one area 1602 and information in the form of a virtual keyboard is displayed in another area 1604 in the example of FIG. 16. Alternatively, the information from the area 1602 may continue into the area 1604, such as shown in the example of FIG. 19. Information displayed in the areas 1602, 1604 may include one or more controls, selection options, and so forth. The controls include but are not limited to one or more selection options, switches, drop-down menus, dials, scrollbars, sliders, and so forth. The displayed information may be information input to the portable electronic device 100, information received in a communication by the portable electronic device 100, e.g., in an electronic mail message, in a short message service (SMS) message, a webpage, a document, a calendar event, a contact, and so forth. An indicator, e.g., a cursor, a marker, a blinking character, a pointer, highlighting, and so forth, may be displayed in the information, such as the indicator 1606 shown in FIG. 16.

When a touch that invokes an enlargement is detected 1504, at least part of the information is displayed 1506 in an enlarged form. The enlargement may be invoked, also referred to as initiated or activated, by detecting a touch associated with a selection option, such as the "EDIT" selection option 1608 in the example of FIG. 16, detecting a gesture, detecting one or more touches or gestures associated with the information, detecting selection of a physical button or key, detecting a touch associated with a menu item, and so forth. A selection option may be utilized to alternate between display of the enlargement and display of other information. The selection option may be displayed in the same location on the display, e.g., the "EDIT" selection option 1608 and the "ABC" selection option 1616.

An indicator, e.g., the indicator 1614 in the example of FIG. 16, may be displayed in the enlargement. For example, the indicator may be an enlarged indicator displayed at a position corresponding with the location of the indicator in the information, e.g., between the same characters of the information, such as shown in FIG. 16, the same highlighted character(s) of the information, and so forth. The touch-sensitive display 118 may optionally display other selection options, such as cut, copy, paste, delete, directional options or controls 1618, 1620, 1622, 1624 in the example of FIG. 16, and so forth.

The information included in the enlargement corresponds with information at or near the indicator, such as shown in the example of FIG. 16. In this example, information from a row above and a row below the indicator 1606 as well as information to the left and right of the indicator 1606 is shown. Because more information than, for example, a single word, is displayed, a user is able to see more information to facilitate easier and more flexible movement of the indicator through the information. Alternatively, information included in the enlargement may correspond with any other information, such as the beginning of information, the end of information, information at or near a misspelled word, information that was previously included in the enlargement, and so forth.

Indicators may be displayed in the enlargement, the information, or both. When a touch associated with any indicator is detected at 1508, the indicator in the information and/or the indicator in the enlargement are moved 1510 in accordance with the touch, e.g., up, down, left, and/or right. If, after a period of time, a touch associated with an indicator is not detected at 1508, the method proceeds to 1512. A touch associated with an indicator includes a touch on, at, or near either indicator, a touch associated with a control for an indicator, such as the directional options 1618, 1620, 1622, 1624 in the example of FIG. 16 or an editing control such as a joystick, any touch in the enlargement or the trackpad, and so forth. In the example of FIG. 17, the touch associated with the indicator may be a touch at touch location 1702 associated with the area 1604 of the touch-sensitive display 118 associated with the display of the enlargement. Alternatively, input may be provided from a control other than the touch-sensitive display 118, such as a physical button, a key of a physical keyboard, a mouse, a navigation device, e.g., a joystick, an optical navigation device, track pad, and so forth. The indicator in the enlargement and/or the indicator in the information may be moved to a different position, may highlight information, may perform another function, or may be modified in any way. The enlargement may function similar to a virtual trackpad, e.g., touches in the area associated with the enlargement move the indicator.

The indicator may highlight the information. One or both ends of the highlighting may be adjusted to select different end points, e.g., characters, of the highlighting within the information. The end points may be moved one at a time, e.g., selection and optional movement of one end point followed by selection and optional movement of the other end point. The end points may be selected/moved in any order, and selection/movement may be repeated for either or both end points. Optionally, both end points may be moved simultaneously, e.g., by separate touches, one associated with each end point. The highlighting may be any type of marking of the information to cause the highlighted information to appear different than unhighlighted information, such as background color or style, underlining, outlining, bolding, italics, shading, text coloring, font, relative information size, and so forth.

Information displayed in the enlargement may change as the indicator moves through the information. For example, the information displayed in the enlargement may change responsive to the movement of the indicator to maintain the indicator at or near the center of the enlargement. For example, the indicator or the word in which the indicator is located may be centered in the area of the enlargement. An indicator may be at or near the center of enlargement when the indicator is close to the center, is about the center, is away from the center by a character, a word, a line of text, and so forth. An indicator may be offset from the center due to the size of information displayed in an enlargement, due to the length of a line of the information, due to the length of a word, and so forth.

When an indication to end the enlargement is detected 1512, the display of the enlargement ends. For example, the virtual keyboard may be displayed to replace the display of the enlargement, the display of the information may be expanded to replace the display of the enlargement, additional controls may be displayed to replace the display of the enlargement, and so forth. The indication to end the enlargement may be detected at 1512 upon detecting selection of a selection option to end enlargement, such as the "ABC" selection option 1616, after a period of time occurs without detecting a touch, upon detection of a gesture indicating end of the enlargement, completion of an editing function such as cut, copy, paste, delete, and so forth.

Although the method of FIG. 15 is described with reference to FIG. 16 and FIG. 17, the method is applicable to FIG. 18 and FIG. 19 and any other electronic device.

Information is displayed on the device 100 in an upper area 1602 and a virtual keyboard is displayed in a lower area 1604 of the left device 100 in the example of FIG. 16. An indicator 1606 is displayed in the information in this example. The two areas may be separated from each other, adjacent to each other, distanced from each other, side by side vertically or horizontally, one area at least partially surrounding the other area, and so forth. The information in the upper area 1602 may be displayed in the lower area 1604 and the information in the lower area 1604 may be displayed in the upper area 1602. A boundary line or other visual element may separate the areas. The information in the upper area 1602 may continue into the lower area 1604 and no visual element may separate the areas, as shown in the example of FIG. 19. Alternatively, the areas 1602, 1604 may at least partially overlap, where the enlargement or the information is partially translucent.

The sizes of the areas may vary. As shown in the example of FIG. 16, the size of the upper area 1602 on the right device 100 is smaller than the upper area 1602 of the left device 100, and the lower area 1604 of the right device 100 is larger than the lower area 1604 of the left device 100. Alternatively, the size of the upper area may increase and the size of the lower area may be decrease when the enlargement is displayed, or the sizes of the areas may remain the same. Optionally, the sizes of the areas may change while the enlargement is displayed, for example, to facilitate display of larger words in the enlargement, to facilitate faster movement of the indicator, and so forth.

The display of the virtual keyboard on the left device 100 in the example of FIG. 16 includes a selection option 1608 labeled "EDIT" that may be utilized to invoke the enlargement. Detection of a touch at a touch location associated with the selection option 1608, such as the location 1610 in FIG. 16, invokes the enlargement 1612. The selection option 1608 may include a label, such as a text label, a graphic label, a symbolic label, and so forth.

The enlargement 1612 includes display of some of the information from the upper area 1602 in a larger size than the information displayed in the upper area 1602. As shown on the right device 100 of FIG. 16, the enlarged information is centered at or near the cursor 1614 displayed in the enlargement. Any part of the information may be displayed in the enlargement. The amount by which the display of the information is increased in size, e.g., the amount of "zoom," the amount of magnification, and so forth, and the number of lines of information displayed may vary from the example of FIG. 16. The amount of enlargement may be uniform or variable, e.g., information near an indicator or in the same row as an indicator may be enlarged more than other information. The amount of enlargement may be adjusted in response to a touch associated with a selection option, a control, a gesture, a menu selection, or any other input.

The indicator 1614 is displayed at a position in the enlargement 1612 corresponding to a position of the indicator 1606 in the information displayed in the upper area 1602. The indicator 1614 is displayed at or near the center of the enlargement 1612 in this example. Alternatively, the enlargement 1612 and the indicator 1614 may be displayed such that the indicator 1614 is in another position relative to the enlargement 1612, such as at or near the top left corner, or any other position.

To facilitate end of display of the enlargement, a selection option may be displayed, such as the "ABC" selection option 1616 displayed in the lower area 1604 of the right device 100 in the example of FIG. 16.

When the enlargement is displayed, the electronic device 100 optionally displays editing controls. For example, directional options 1618, 1620, 1622, 1624 are shown displayed in the lower area 1604 in the example of FIG. 16. When a touch associated with any of the direction options 1618, 1620, 1622, 1624 is detected, the indicator 1614 and the indicator 1606 are moved in accordance with the direction associated with the control. In this example, the directional options 1618, 1620, 1622, 1624 are associated with the directions up, left, right, and down with respect to the orientation of the text.

As shown in the example of FIG. 17, a touch at a touch location 1702 associated with the indicator 1614 is detected, and the indicator 1614 is moved in accordance with the touch from the position of the indicator 1614 shown on the left device 100 to the position of the touch location 1702 on the right device 100. The touch is detected at the touch location 1702 between "o" and "r" in the word "for" in this example. The indicators 1606, 1614 are moved to the corresponding position in the information displayed in both areas 1602, 1604. As shown in FIG. 17, the part of the information displayed in the enlargement changes, such that the indicator 1614 remains at or near the center of the enlargement. In this example, the information displayed in the enlargement moves to the left as the indicator 1614 moves to the right to maintain the indicator 1614 at or near the center of the enlargement. Alternatively, the information may not change based on the movement of the indicator, may be changed but delayed from movement of the indicator, may be changed in response to detecting a touch associated with a control, may be changed in response to detecting movement of a touch associated with the indicator, may be changed to facilitate viewing of other parts of the information, and so forth. Moving includes changing the position of information, which movement may or may not be animated to appear as though the information is moving across the touch-sensitive display 118.

Figure 18:
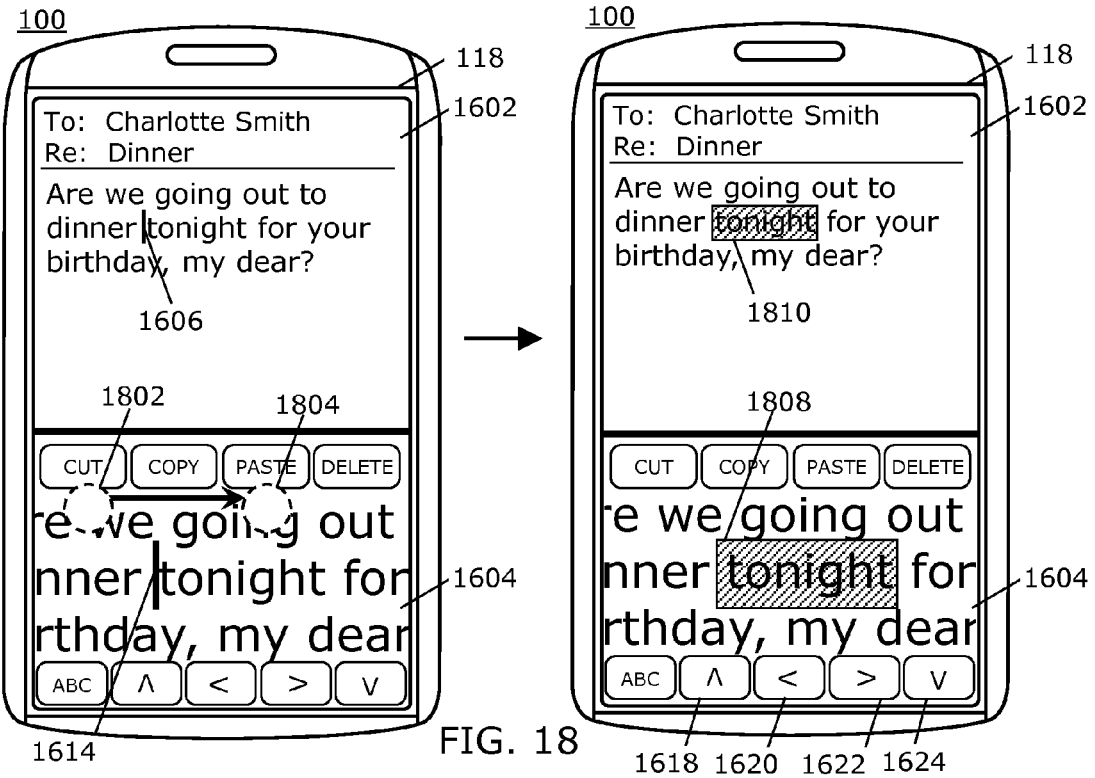
FIG. 18 illustrates an example of highlighting of information on an electronic device in accordance with the disclosure.

An indicator illustrating highlighting of information is shown in the example of FIG. 18. Highlighting may be initiated by detection of a touch associated with a selection option, a gesture, selection from a menu, depression of a physical key, movement of a mouse, a touch on a physical navigation device, a combination of inputs, and so forth. For example, editing controls displayed in the lower area 1604 may include a selection option for initiating highlighting or a double tap may initiate highlighting. In the example of FIG. 18, when a touch associated with any of the directional options 1618, 1620, 1622, 1624 is detected after highlighting is initiated, an end point of the highlighting moves accordingly. After highlighting is initiated, editing functions may be performed such as, copying highlighted information, cutting highlighted information, deleting highlighted information, pasting highlighted information, and so forth. A second editing function, such as pasting information, may optionally be performed, for example, by moving the indicator to the past position as described above.

As shown in the example of FIG. 17, controls 1708 and 1710, which may be similar to controls 1502, 1504 described above, may also be provided. The control 1708 and 1710 may be displayed or not displayed, e.g., provided in a non-display area. The controls 1708 and 1710 may be provided in addition to or as an alternative to the selection options 1618, 1620, 1622, and 1624.

In the example of FIG. 18, after a double tap in the lower area 1604 initiates highlighting, a touch moves from a first touch location 1802 along the display to a second location 1804. The first touch location 1802 is associated with the first "t" in "tonight" and the second touch location 1804 is associated with the second "t" in "tonight" in this example. The highlighting is displayed with the information in the enlargement between the two positions in the text, thus highlighting 1808 of "tonight" is displayed. Optionally, an indication of the end points of the highlighting may be displayed and a visual indication may be displayed to indicate the end point that is currently being manipulated. Highlighting may be displayed in one or both of the areas 1602, 1604. In this example, highlighted information 1810 corresponding to highlighted information 1808 from the enlargement is displayed. Highlighting may persist in the area 1602 after display of the enlargement is ended. Additionally or alternatively, the directional options 1618, 1620, 1622, 1624 may persist after display of the enlargement is ended. Alternatively, highlighting may not be displayed in the upper area. Optionally, highlighting 1810 may be displayed when display of the enlargement ends.

Prior to invocation of the enlargement, information may be displayed seamlessly or continuously in both areas 1602, 1604 of the device 100 as shown in the example of FIG. 19. The information may be a single continuous set of information, may be multiple discrete sets of information, and so forth. For example, an email, a webpage, a document, and so forth may be displayed. When the enlargement 1612 is invoked, the enlargement replaces part of the display of the information in the second area 1604. Although characters are shown in FIG. 19, the information may include images, graphics, symbols, other types of information, and so forth.

Display of the enlargement of information facilitates movement of an indicator through information displayed on a touch-sensitive display, making editing of the information easier. Because the information is displayed in a larger size, movement of an indicator through the information, such as moving a cursor or highlighting information, facilitates reviewing or editing of the information. The enlargement is advantageously applied to portable electronic devices, which typically include relatively small touch-sensitive displays. Selection options may be provided to invoke display of the enlargement and to indicate end of display of the enlargement. Additional selection options for editing or manipulation the information may be provided.

An electronic device comprises a touch-sensitive display and a processor operably coupled with the touch-sensitive display and configured to display information in a first area of a touch-sensitive display of an electronic device, display an enlargement including at least part of the information in a second area outside the first area to replace at least part of a virtual keyboard, detect a touch associated with the second area, and move a first indicator in the first area and a second indicator in the second area along with the touch. A method comprises displaying information in a first area of a touch-sensitive display of an electronic device, displaying an enlargement including at least part of the information in a second area outside the first area to replace at least part of a virtual keyboard, detecting a touch associated with the second area, and moving a first indicator in the first area and a second indicator in the second area along with the touch. The method may also include displaying a control in the second area to control the first indicator and the second indicator. The method may also include changing at least part of the information displayed in the enlargement based on the movement of the second indicator.

The words above, below, upper, lower, up, down, left, and right provide a perspective for the drawings and are not otherwise limiting. In the present disclosure, an indicator may be at or near the center of an area when the indicator is close to the center, is about the center, is away from the center by a character, a line of text, or a word, and so forth. Although touch locations are shown as circles with dashed lines the actual touch locations may be larger or smaller, e.g., a point. Although example locations of the selection options and controls 202, 204, 212, 706, 708, 710, 712, 1008, 1010, 1012, 1014, 1016, 1202, 1302, 1402, 1404, 1406, 1604, 1608, 1616, 1618, 1620, 1622, 1624, 1708, 1710, and other elements are shown in FIG. 2, FIG. 3, FIG. 4, FIG. 5, FIG. 7, FIG. 8, FIG. 10, FIG. 12, FIG. 13, FIG. 14, FIG. 16, FIG. 17, FIG. 18, and FIG. 19, selection options, controls, and other elements may be located at any locations such as at the top of a display, at the bottom of a display, along a side of the display, in any area of a non-display area, and so forth.

Elements of the examples described herein are interchangeable. Any of the elements of the various examples are combinable to the extent that the elements are not mutually exclusive or do not conflict.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method, comprising:
    displaying information on a touch-sensitive display of an electronic device, wherein the touch-sensitive display has a first control that moves an indicator through the information in a first direction and a second control that moves the indicator through the information in a second direction, wherein the first control and the second control are stationary during movement of the indicator;
    detecting a first touch of the first control and a second touch of the second control overlap in time for a predefined time period; and
    in response to detecting the overlap, executing an editing function on one or more characters adjacent the indicator.

2. The method of claim 1, wherein the editing function comprises at least one of highlighting, cutting, copying, deleting, or pasting.

3. The method of claim 1, further comprising:
    detecting a third touch of the first control while the second touch of the second control is maintained; and
    in response to the first touch, expending the editing function in the first direction.

4. The method of claim 1, further comprising displaying a first indication of the first control and a second indication of the second control.

5. The method of claim 1, wherein the first control and the second control are located in a non-display area of the touch-sensitive display.

6. The method of claim 1, wherein the predefined time period comprises 200 milliseconds, 0.75 seconds, or 1.25 seconds.

7. An electronic device, comprising:
    a touch-sensitive display configured to:
        display information, wherein the touch-sensitive display has a first control that moves an indicator through the information in a first direction and a second control that moves the indicator through the information in a second direction, wherein the first control and the second control are stationary during movement of the indicator;
        detect a first touch of the first control and a second touch of the second control overlap in time for a predefined time period; and
    in response to detecting the overlap, one or more processors configured to execute an editing function on one or more characters adjacent the indicator.

8. The electronic device of claim 7, wherein the editing function comprises at least one of highlighting, cutting, copying, deleting, or pasting.

9. The electronic device of claim 7, further comprising:
    the touch-sensitive display further configured to detect a third touch of the first control while the second touch of the second control is maintained; and
    in response to the first touch, the one or more processors further configured to expend the editing function in the first direction.

10. The electronic device of claim 7, the touch-sensitive display further configured to display a first indication of the first control and a second indication of the second control.

11. The electronic device of claim 7, wherein the first control and the second control are located in a non-display area of the touch-sensitive display.

12. The electronic device of claim 7, wherein the predefined time period comprises 200 milliseconds, 0.75 seconds, or 1.25 seconds.

13. A non-transitory computer readable medium storing instructions to cause a processor to perform operations comprising:
    displaying information on a touch-sensitive display of an electronic device, wherein the touch-sensitive display has a first control that moves an indicator through the information in a first direction and a second control that moves the indicator through the information in a second direction, wherein the first control and the second control are stationary during movement of the indicator;
    detecting a first touch of the first control and a second touch of the second control overlap in time for a predefined time period; and
    in response to detecting the overlap, executing an editing function on one or more characters adjacent the indicator.

14. The computer readable medium of claim 13, wherein the editing function comprises at least one of highlighting, cutting, copying, deleting, or pasting.

15. The computer readable medium of claim 13, the instructions further comprising:
    detecting a third touch of the first control while the second touch of the second control is maintained; and
    in response to the first touch, expending the editing function in the first direction.

16. The computer readable medium of claim 13, the instructions further comprising displaying a first indication of the first control and a second indication of the second control.

17. The computer readable medium of claim 13, wherein the first control and the second control are located in a non-display area of the touch-sensitive display.

18. The computer readable medium of claim 13, wherein the predefined time period comprises 200 milliseconds, 0.75 seconds, or 1.25 seconds.

* * * * *